(12) United States Patent
Tsuda et al.

(10) Patent No.: US 8,942,023 B2
(45) Date of Patent: Jan. 27, 2015

(54) SEMICONDUCTOR DEVICE

(75) Inventors: Hiroshi Tsuda, Kanagawa (JP);
Yoshitaka Kubota, Kanagawa (JP);
Kenichi Hidaka, Kanagawa (JP);
Hiromichi Takaoka, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 243 days.

(21) Appl. No.: 13/566,575

(22) Filed: Aug. 3, 2012

(65) Prior Publication Data
US 2013/0033921 A1    Feb. 7, 2013

(30) Foreign Application Priority Data

Aug. 5, 2011   (JP) .................................. 2011-171979

(51) Int. Cl.
*G11C 11/00*      (2006.01)
*G11C 7/24*       (2006.01)
*G11C 13/00*      (2006.01)
*G06F 21/75*      (2013.01)
*G06F 21/79*      (2013.01)

(52) U.S. Cl.
CPC ............. *G11C 7/24* (2013.01); *G11C 13/0004* (2013.01); *G11C 13/003* (2013.01); *G11C 13/0059* (2013.01); *G06F 21/75* (2013.01); *G06F 21/79* (2013.01); *G11C 2213/74* (2013.01); *G11C 2213/79* (2013.01)
USPC ........................................... 365/148; 365/94

(58) Field of Classification Search
USPC ............................ 365/148, 94, 100, 187, 188
See application file for complete search history.

(56) References Cited

U.S. PATENT DOCUMENTS

| | | | |
|---|---|---|---|
| 5,940,545 A | 8/1999 | Kash et al. | |
| 6,410,352 B2 | 6/2002 | Damon et al. | |
| 6,590,797 B1 | 7/2003 | Nachumovsky et al. | |
| 7,298,640 B2 * | 11/2007 | Chen et al. | 365/148 |
| 7,663,915 B2 | 2/2010 | Kato | |
| 7,961,534 B2 * | 6/2011 | Kang et al. | 365/193 |
| 2010/0157656 A1 | 6/2010 | Tsuchida | |

FOREIGN PATENT DOCUMENTS

| | | |
|---|---|---|
| JP | 2-226597 A | 9/1990 |
| JP | 8-316427 A | 11/1996 |
| JP | 2005-259334 A | 9/2005 |
| JP | 2010-146665 A | 7/2010 |

OTHER PUBLICATIONS

Communication dated Nov. 4, 2014 from the Japanese Patent Office in counterpart application No. 2011-171979.

* cited by examiner

*Primary Examiner* — Vu Le
(74) *Attorney, Agent, or Firm* — Sughrue Mion, PLLC

(57) ABSTRACT

A semiconductor device using resistive random access memory (ReRAM) elements and having improved tamper resistance is provided. The semiconductor device is provided with a unit cell which stores one bit of cell data and a control circuit. The unit cell includes n ReRAM elements (n being an integer of 2 or larger). At least one of the ReRAM elements is an effective element where the cell data is recorded. In reading the cell data, the control circuit at least selects the effective element and reads data recorded thereon as the cell data.

14 Claims, 20 Drawing Sheets

SEMICONDUCTOR DEVICE

CROSS-REFERENCE TO RELATED APPLICATIONS

The disclosure of Japanese Patent Application No. 2011-171979 filed on Aug. 5, 2011 including the specification, drawings and abstract is incorporated herein by reference in its entirety.

BACKGROUND

The present invention relates to a semiconductor device including resistive random access memory (ReRAM) elements.

In semiconductor integrated circuits, one-time programmable (OTP) memory to which data can be written only once is generally used to store memory redundancy information. The memory elements used for OTP memory includes, for example, electrically writable fuse elements and antifuse elements.

FIG. 1 is a conceptual diagram showing a typical MOS type (gate insulating film destruction type) antifuse element. Like in MOS transistors and MOS capacitors, a gate electrode 3 is formed over a P well 1 via a gate insulating film 2. The MOS type antifuse element is a two-terminal element having a first terminal T1 and a second terminal T2. In the example shown in FIG. 1, the gate electrode 3 is coupled to the first terminal T1 and a source/drain diffusion layer is coupled to the second terminal T2.

This MOS type antifuse element is a type of ReRAM element which stores data making use of a resistance change. To be more concrete, the gate insulating film 2 can be broken down by applying a high voltage between the first terminal T1 and the second terminal T2. Depending on whether or not the gate insulating film 2 is broken down, the conduction (resistance) between the first terminal T1 and the second terminal T2 changes between two states which correspond to data "0" and data "1". For example, as shown in FIG. 1, a non-conducting state (an unwritten state) with the gate insulating film 2 unbroken corresponds to data "0" and a conducting state (a written state) with the gate insulating film 2 broken down corresponds to data "1".

When data is to be read, a read voltage is applied between the first terminal T1 and the second terminal T2. When an element current flowing between the first terminal T1 and the second terminal T2 exceeds a threshold value, the data stored is determined to be "1"; otherwise the data stored is determined to be "0". When the data stored is "1" with an element current flowing between the first terminal T1 and the second terminal T2, a substrate current Isub flows through the P well 1 as shown in FIG. 1.

FIG. 2 shows a configuration of a general memory cell array including antifuse elements (see FIG. 3 of Japanese Unexamined Patent Publication No. Hei 08 (1996)-316427. A memory cell 305 for storing one bit of data has an antifuse element 301 and a selection transistor 302. The gate of the selection transistor 302 is coupled to a word line 303. One end of the antifuse element 301 is coupled to the drain of the selection transistor 302. The other end of the antifuse element 301 is coupled to a bit line 304. The word line 303 is coupled to a word decode circuit 306. The bit line 304 is coupled to a bit decode circuit 307.

In Japanese Unexamined Patent Publication No. Hei 08 (1996)-316427, a circuit configuration in which a selection transistor is shared by plural antifuse elements is also disclosed. In such a configuration, too, the antifuse elements can each function as an individual memory cell to store one bit of data. A similar circuit configuration is also disclosed in each of U.S. Pat. No. 6,410,352 and U.S. Pat. No. 6,590,797.

In Japanese Unexamined Patent Publication No. 2010-146665, a redundancy technique used in resistance nonvolatile semiconductor memory is disclosed.

In U.S. Pat. No. 5,940,545, a technique to detect faint photoemission attributable to a current flowing in a semiconductor layer during operation of a semiconductor integrated circuit is disclosed.

SUMMARY

In recent years, one-time programmable (OTP) memories are required to be highly tamper-resistant. The antifuse element as shown in FIG. 1 is generally said to be highly tamper-resistant. It is because clearly determining, by physical analysis, whether the antifuse element is in a broken state (a written state) or in a non-broken state (an unwritten state) is difficult.

The present inventors, however, have recognized a possibility that antifuse elements like the one shown in FIG. 1 do not necessarily have high tamper resistance. When, as described in the foregoing, the data stored with an element current flowing between the first terminal T1 and the second terminal T2 is "1", a substrate current Isub also flows in the P well 1. In that state, faint photoemission attributable to the substrate current Isub may possibly be detected using the analysis technique disclosed in U.S. Pat. No. 5,940,545. Namely, whether the data stored is "0" or "1" may possibly be determined based on whether the photoemission is detected or not.

The above problem is not limited to the antifuse elements. By using an analysis technique similar to the technique disclosed in U.S. Pat. No. 5,940,545 or by using a presently unknown analysis technique, the data stored in a ReRAM element may possibly be read from outside.

An object of the present invention is to provide a technique for improving the tamper resistance of a semiconductor device including ReRAM elements.

Another object of the present invention is to provide a new circuit configuration of a semiconductor device including ReRAM elements.

In the following, solutions to the above problem according to the present invention will be described using reference numerals and letters used in "DETAILED DESCRIPTION" of this specification. The reference numerals and letters are parenthesized and intended to clarify correspondence between the description under "WHAT IS CLAIMED IS" and "DETAILED DESCRIPTION." Note, however, that the reference numerals and letters should not be used in interpreting the technical scope of the invention defined by "WHAT IS CLAIMED IS."

According to one aspect of the present invention, a semiconductor device is provided. The semiconductor device is provided with a unit cell (10) which stores one bit of cell data and a control circuit (100). The unit cell (10) includes n resistive random access memory (ReRAM) elements (31) (n being an integer of 2 or larger). At least one of the ReRAM elements (31) is an effective element (40) where the cell data is recorded. In reading the cell data, the control circuit (100) at least selects the effective element (40) and reads data recorded on the effective element (40) as the cell data.

According to another aspect of the present invention, a semiconductor device is provided. The semiconductor device is provided with a unit cell (10) which stores one bit of cell data, a word line (WL), a bit line (BL) and a source line (SL). The unit cell (10) includes a first transistor (20) and n memory units (30) (n being an integer of 2 or larger). The gate of the first transistor (20) is coupled to the word line (WL). Of the source and the drain of the first transistor (20), one is coupled to the bit line (BL) and the other is coupled to a first node (N1). The n memory units (30) are coupled in parallel between the first node (N1) and the source line (SL). The n memory units (30) each include a ReRAM element (31) and a second transistor (32). The ReRAM element (31) has a first terminal (T1) and a second terminal (T2). The first terminal (T1) is coupled to the first node (N1) and the second terminal (T2) is coupled to the second node (N2). The gate of the second transistor (32) is coupled to a subword line (SWL). Of the source and the drain of the second transistor (32), one is coupled to the second node (N2) and the other is coupled to the source line (SL).

According to the present invention, the tamper resistance of a semiconductor device including ReRAM elements can be improved.

According to the present invention, a new circuit configuration of a semiconductor device including ReRAM elements is provided.

DETAILED DESCRIPTION

An embodiment of the present invention will be described with reference to drawings.

1. Unit Cell

In the embodiment of the present invention, a concept of "unit cell" is introduced. A unit cell is used to store one bit of data. One bit of data recorded in a unit cell will be referred to as "cell data."

Figure 3:
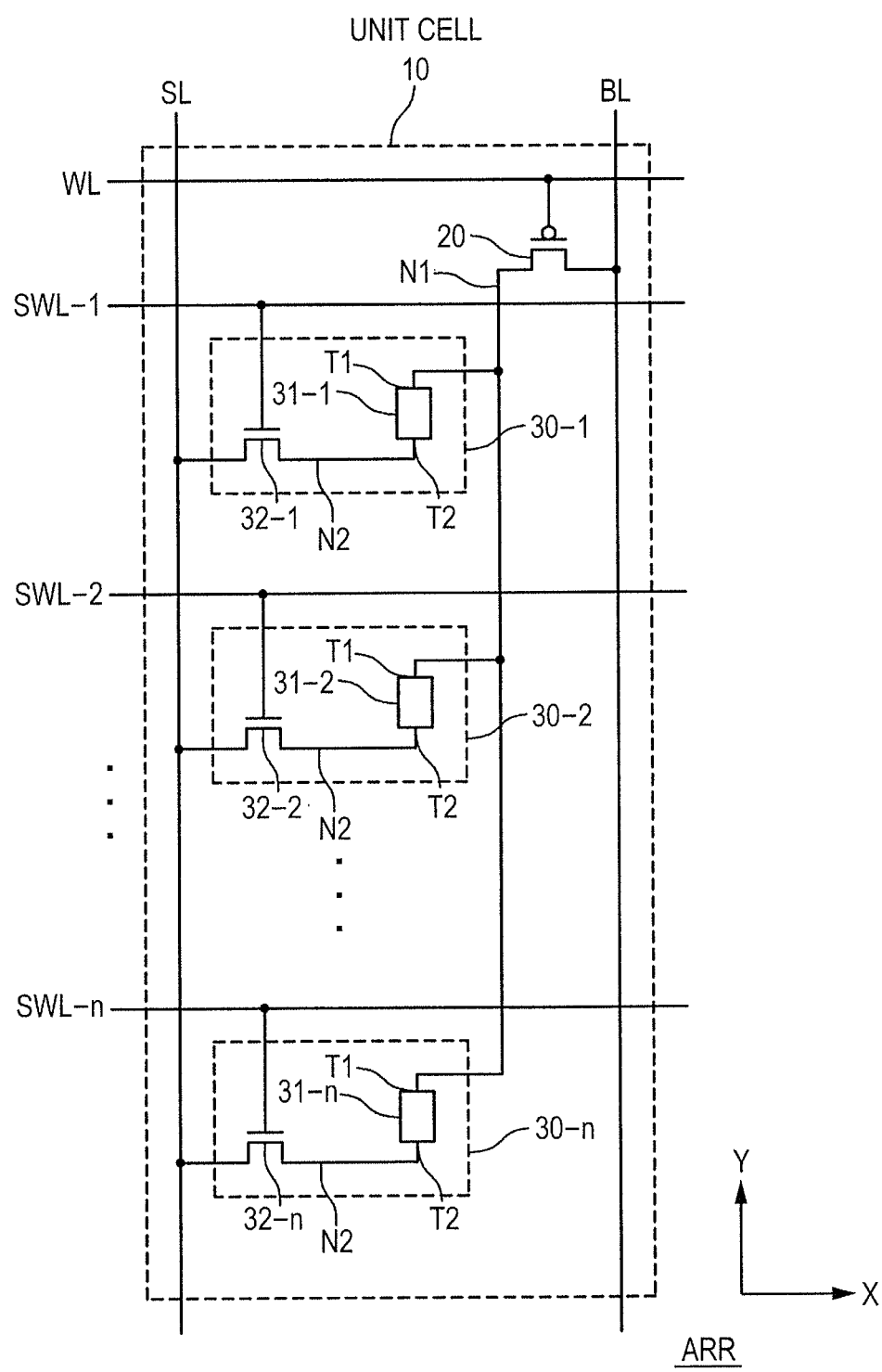
FIG. 3 is a circuit diagram showing an example configuration of a unit cell according to an embodiment of the present invention.

FIG. 3 is a circuit diagram showing an example configuration of a unit cell 10 according to the present embodiment. The unit cell 10 includes a cell selection transistor 20 and as many as n memory units 30-1 to 30-n, n being an integer of 2 or larger.

The cell selection transistor 20 is used to select the unit cell 10. The gate of the cell selection transistor 20 is coupled to a word line WL. Of the source/drain diffusion layers of the cell selection transistor 20, one is coupled to a bit line BL and the other is coupled to a first node N1 in the unit cell 10. In the example shown in FIG. 3, the cell selection transistor 20 is a p-channel MOS transistor.

The memory units 30-1 to 30-n are coupled in parallel between the first node N1 and a source line SL, i.e. all coupled between the single first node N1 (common node) and the single source line SL (common source line).

Each memory unit 30-i (i=1 to n) is configured as follows. Each memory unit 30-i includes a resistive random access memory (ReRAM) element 31-i and an element selection transistor 32-i.

The ReRAM element 31-i stores data making use of a resistance change. To be more concrete, the ReRAM element 31-i is a two-terminal element having a first terminal T1 and a second terminal T2 and is capable of changing the value of resistance between the first terminal T1 and the second terminal T2. Among this type of ReRAM elements 31 are fuse elements, antifuse elements, elements used as ReRAM cells and elements used as phase-change random access memory (PRAM) cells. The first terminal T1 of the ReRAM element 31-i is coupled to the first node N1 (common node). Namely, the first terminals T1 of ReRAM elements 31-1 to 31-n included in the unit cell 10 are commonly coupled to the same first node N1. On the other hand, the second terminal T2 of each ReRAM element 31-i is coupled to the second node N2 in each memory unit 30-i.

Each element selection transistor 32-i is used to select the corresponding ReRAM element 31-i. The gate of each element selection transistor 32-i is coupled to the corresponding subword line SWL-i. Of the source/drain diffusion layers of each element selection transistor 32-i, one is coupled to the second node N2 in the memory unit 30-i and the other is coupled to the source line SL (common source line). Namely, the element selection transistors 32-1 to 32-n included in the unit sell 10 are commonly coupled to the same source line SL.

In the example shown in FIG. 3, the element selection transistors 32 are n-channel MOS transistors.

At the second node N2 in each memory unit 30-$i$, wiring does not branch. Namely, in each memory unit 30-$i$, the second node N2 only electrically couples the second terminal T2 of the ReRAM element 31-$i$ and a source/drain diffusion layer of the element selection transistor 32-$i$.

Figure 1:
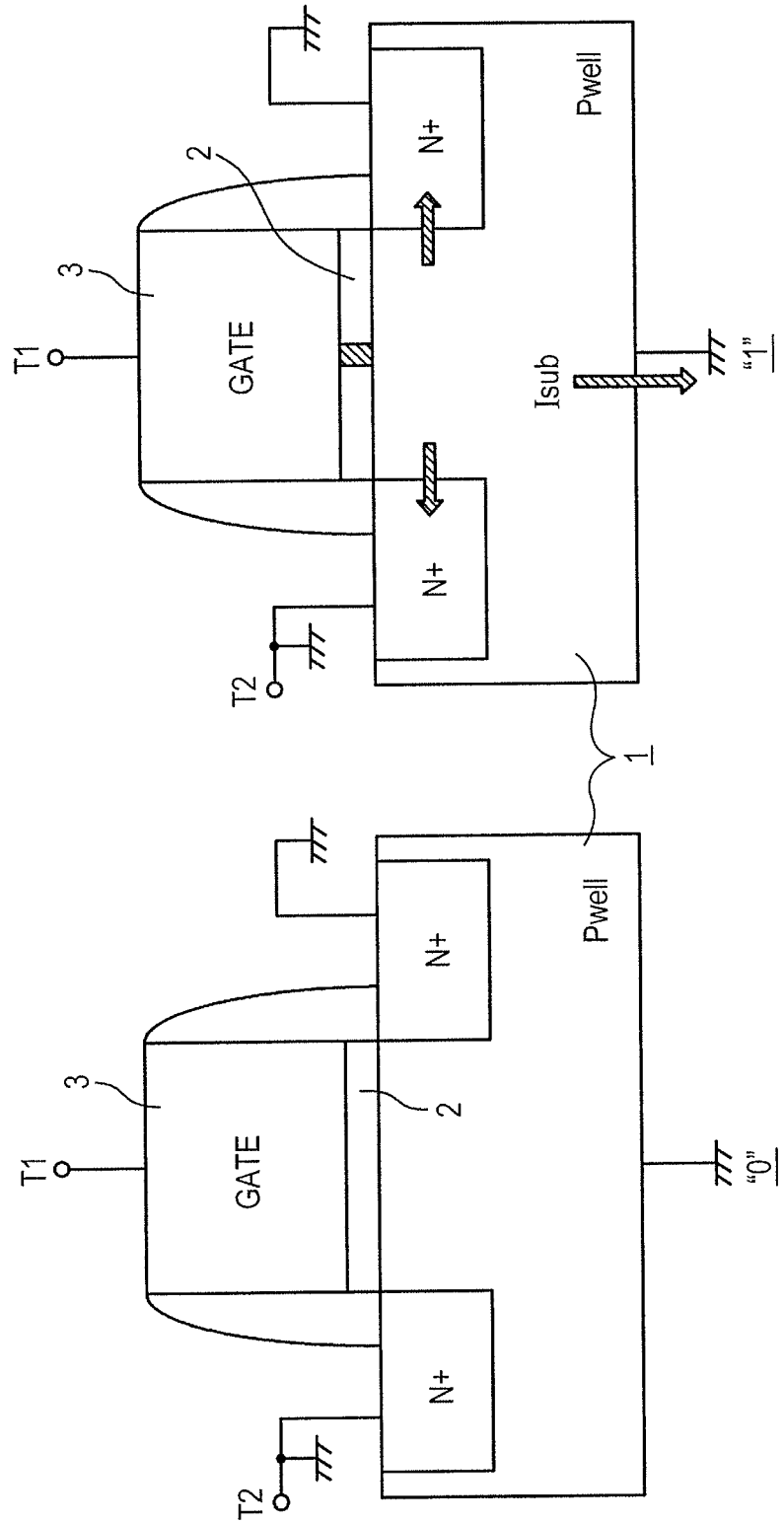
FIG. 1 is a conceptual diagram showing a typical MOS type antifuse element.
Figure 2:
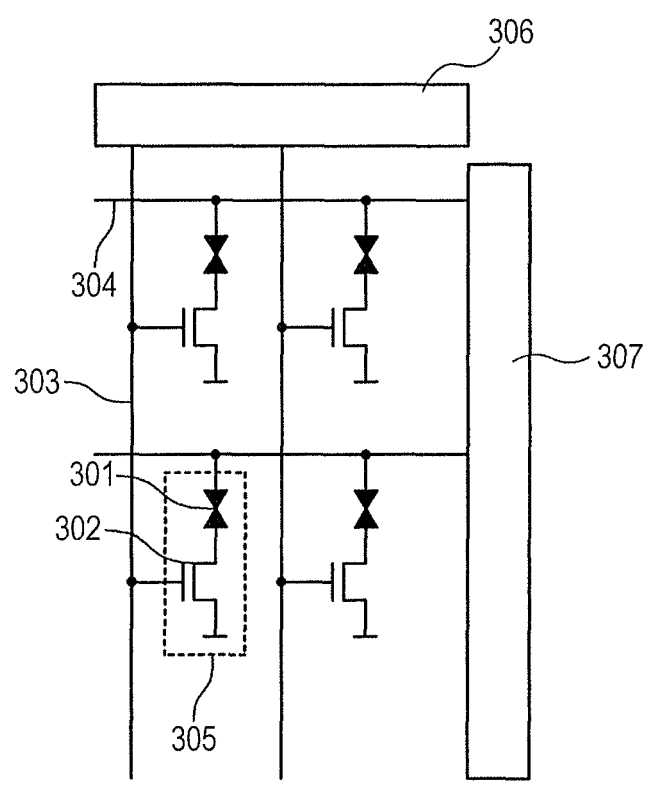
FIG. 2 is a circuit block diagram showing a configuration of a general memory cell array including antifuse elements.
Figure 4:
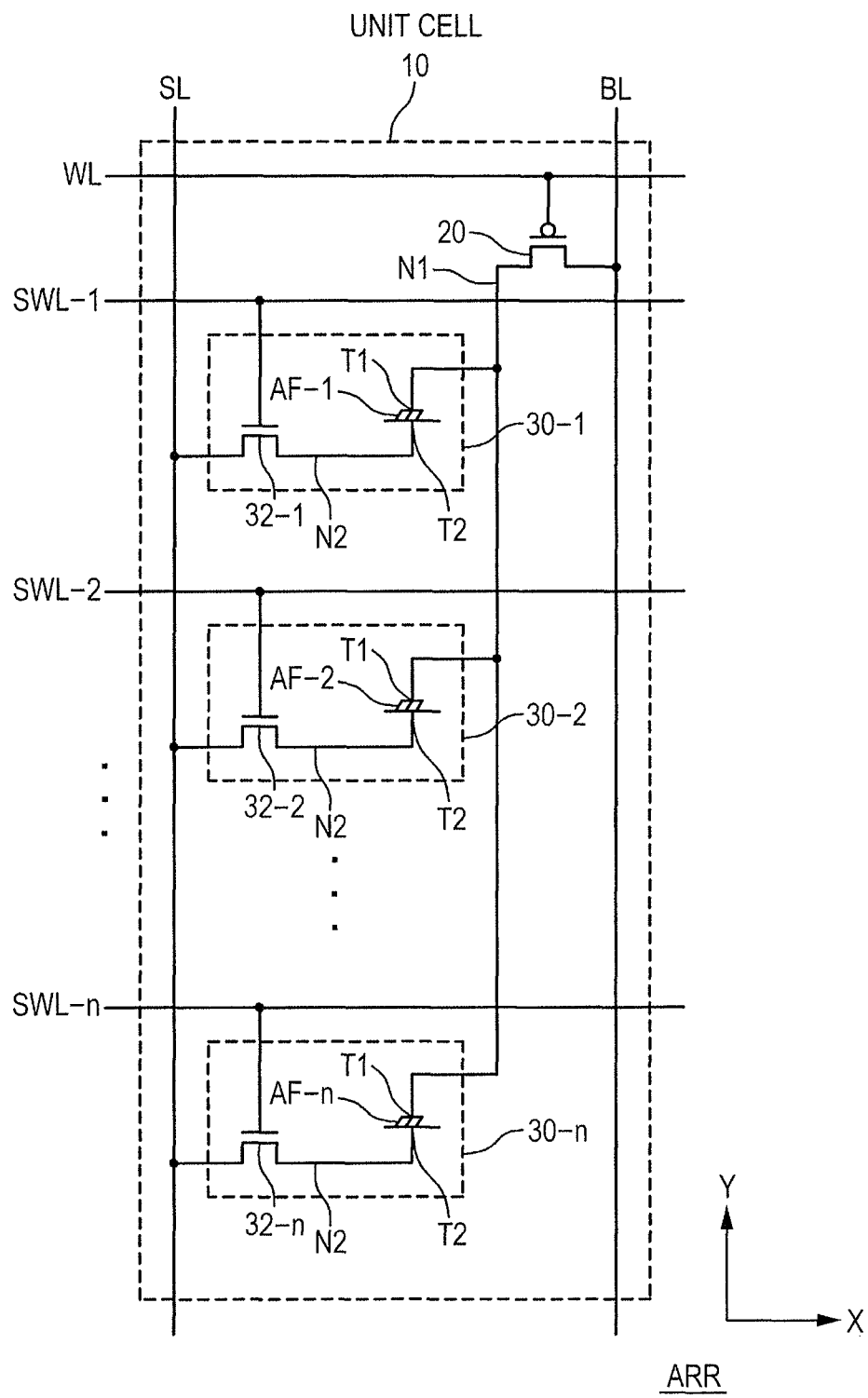
FIG. 4 is a circuit diagram showing another example configuration of a unit cell according to the embodiment of the present invention.

FIG. 4 shows an example configuration of the unit cell 10 in which each ReRAM element 31-$i$ is an antifuse element AF-$i$. The antifuse element AF-$i$ is of a MOS type (gate insulating film destruction type) as shown in FIG. 1. Note that MOS-type antifuse elements include both MOS transistor-type and MOS capacitor-type antifuse elements.

The antifuse element AF-$i$ is a two-terminal element having a first terminal T1 and a second terminal T2. To be more concrete, the gate electrode of the antifuse element AF-$i$ is one of the first terminal T1 and the second terminal T2, and the diffusion layer (source, drain, well) of the antifuse element AF-$i$ is the other of the first terminal T1 and the second terminal T2.

The following description is based on an example in which, as shown in FIG. 4, the ReRAM element 31-$i$ is the antifuse element AF-$i$.

2. Semiconductor Device and Basic Operation

Figure 5:
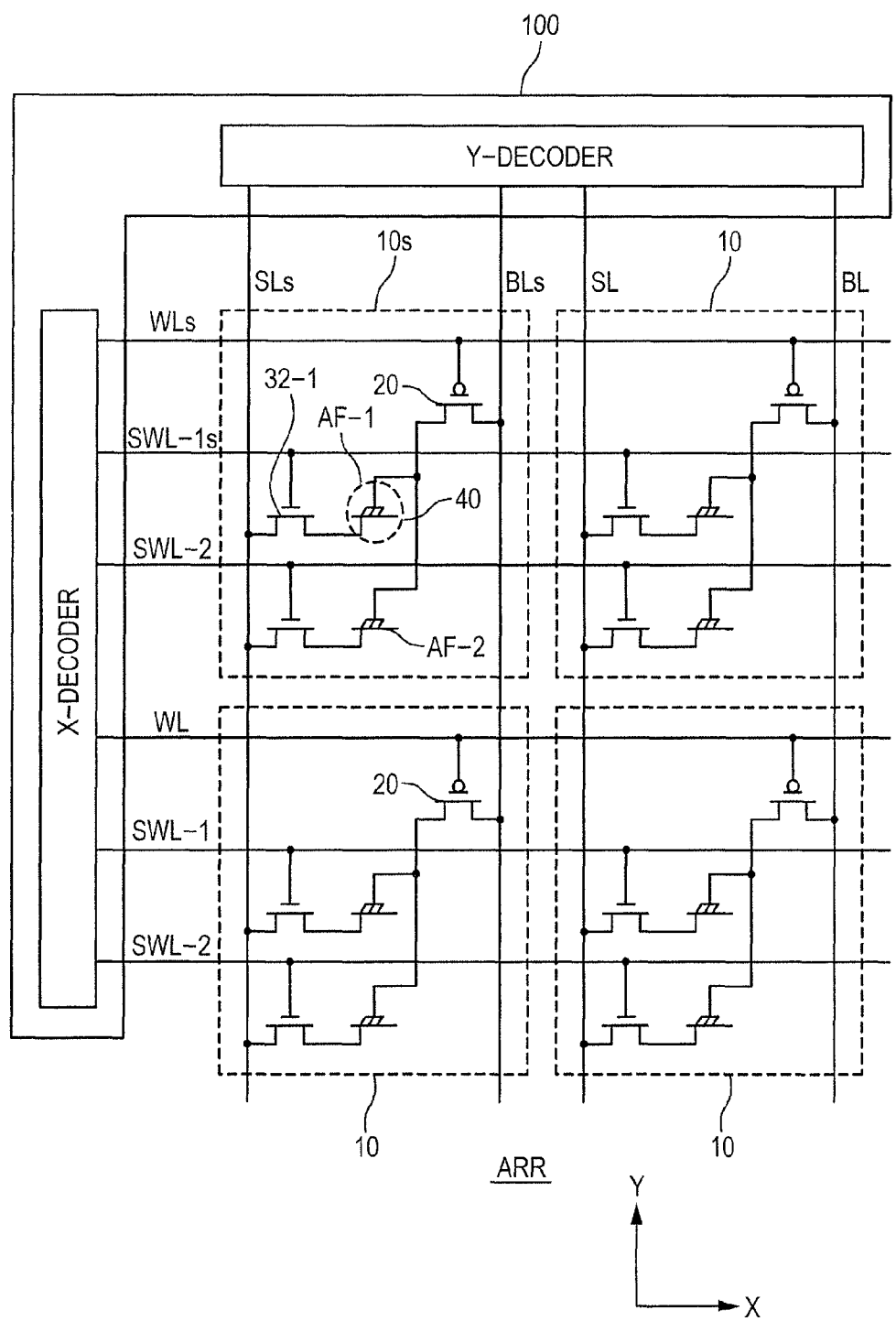
FIG. 5 is a circuit block diagram showing an example configuration of a semiconductor device including unit cells according to the embodiment of the present invention.

FIG. 5 shows an example configuration of a semiconductor device (semiconductor memory device) including unit cells 10 according to the present embodiment. The semiconductor device has a cell array ARR and a control circuit 100.

The cell array ARR includes plural unit cells 10 arranged in a matrix. In the example configuration shown in FIG. 5, word lines WL and subword lines SWL extend in parallel in X direction. Each word line WL is commonly coupled to a row of unit cells 10 arranged in X direction. Each subword line SWL-$i$ is commonly coupled to an element selection transistor 32-$i$ included in each of the unit cells 10 arranged in a row along X direction. Bit lines BL and source lines SL extend in parallel in Y direction perpendicular to X direction. Each bit line BL is commonly coupled to a column of unit cells 10 arranged in Y direction. Each source line SL is commonly coupled to a column of unit cells 10 arranged in Y direction.

The configuration of the cell array ARR is not limited to the one shown in FIG. 5. Examples of modified configurations of the cell array ARR will be described later.

The control circuit 100 controls data writing and reading to and from the unit cells 10. To be concrete, the control circuit 100 includes an address determination circuit, an X decoder, a Y decoder and a sense amplifier. The control circuit 100 can select a desired word line WL and a desired subword line SWL via the X decoder. Also, the control circuit 100 can select a desired bit line BL and a desired source line SL via the Y decoder. Furthermore, the control circuit 100 can determine the data recorded in a unit cell 10 via the sense amplifier.

In the following, a unit cell 10 to be accessed for writing data thereto or for reading data therefrom will be referred to as a "selected unit cell 10$s$." The word line WL coupled to the selected unit cell 10$s$ will be referred to as a "selected word line WLs." The bit line BL coupled to the selected unit cell 10$s$ will be referred to as a "selected bit line BLs." The source line SL coupled to the selected unit cell 10$s$ will be referred to as a "selected source line SLs." Based on address information about a selected unit cell 10$s$, the control circuit 100 can select a selected word line WLs out of plural word lines WL, a selected bit line BLs out of plural bit lines BL and a selected source line SLs out of plural source lines SL.

The control circuit 100 can access an arbitrary one of antifuse elements AF-1 to AF-n included in the selected unit cell 10$s$. An antifuse element AF to be accessed for writing data thereto or for reading data therefrom will be hereinafter referred to as a "selected element." In the following, how to write data to a selected element and how to read data from a selected element will be described based on an example in which the antifuse element AF-1 included in the selected unit cell 10$s$ is a selected element. In this case, the subword line SWL-1 coupled to the element selection transistor 32-1 included in the selected unit cell 10$s$ is a selected subword line.

Data is written to the selected element AF-1 in the following manner. The control circuit 100 selects the selected word line WLs and applies a low-level voltage to the selected word line WLs. As a result, the cell selection transistor 20 coupled to the selected word line WLs turns on. The control circuit 100 also selects the selected subword line SWL-1 and applies a high-level voltage to the selected subword line SWL-1. As a result, the element selection transistor 32-1 coupled to the selected subword line SWL-1 turns on. Furthermore, the control circuit 100 applies a high voltage for writing between the selected bit line BLs and the selected source line SLs. This breaks down the gate insulating film to put the selected element AF-1 in a conducting state (a written state). Namely, data "1" is written to the selected element AF-1. Since the selected element AF-1 is individually accessed, it is put in a good written state.

Data is read from the selected element AF-1 in the following manner. The control circuit 100 selects the selected word line WLs and applies a low-level voltage to the selected word line WLs. As a result, the cell selection transistor 20 coupled to the selected word line WLs turns on. The control circuit 100 also selects the selected subword line SWL-1 and applies a high-level voltage to the selected subword line SWL-1. As a result, the element selection transistor 32-1 coupled to the selected subword line SWL-1 turns on. Furthermore, the control circuit 100 applies a predetermined voltage for reading between the selected bit line BLs and the selected source line SLs. The control circuit 100 determines, based on the magnitude of the cell current that flows through the selected unit cell 10$s$ when the voltage for reading is applied, the state of resistance of the selected element AF-1, i.e. the data recorded on the selected element AF-1. To be concrete, when the cell current is larger than a predetermined threshold value, the control circuit 100 determines that the selected element AF-1 is conducting (in a written state) and that the data recorded there is "1". When, on the other hand, the cell current is smaller than the predetermined threshold value, the control circuit 100 determines that the selected element AF-1 is not conducting (in an unwritten state) and that the data recorded there is "0".

As described above, the antifuse elements AF-1 to AF-n included in the unit cell 10 can be individually accessed for data writing and reading. It is, however, only one bit of data that is treated as the cell data recorded in the unit cell 10. In the present embodiment, out of the antifuse elements AF-1 to AF-n included in each unit cell 10, at least one is specified as an effective element 40. The effective element 40 is an antifuse element AF included in the unit cell 10 and one bit of data can be written as cell data to the effective element 40. When two or more effective elements 40 are specified in a unit cell 10, the same cell data is written to all of the effective elements 40.

For the selected unit cell 10$s$ shown in FIG. 5, for example, the antifuse element AF-1 is specified as an effective element 40. In reading the cell data recorded in the selected unit cell 10$s$, the control circuit 100 selects at least the effective element 40 as a selected element and reads the data recorded on the effective element 40 as the cell data. The antifuse element other than the effective element 40, i.e. the antifuse element AF-2 in the selected unit cell 10s may be said to be a dummy element. The control circuit 100 may read data recorded on the dummy element, but the data read from the dummy element is not treated as the cell data. The presence of such a dummy element contributes toward improving the tamper resistance of the unit cell 10.

The semiconductor device configured as described above can be used in various ways. Some usage examples of the semiconductor device according to the present embodiment will be described below.

3. First Usage Example

In a first usage example, a "0"-state element (an element in an unwritten state) having data "0" written thereon and a "1"-state element (an element in a written state) having data "1" written thereon are both present in a single unit cell 10. Namely, the antifuse elements AF-1 to AF-n included in each unit cell 10 include at least one "0"-state element and at least one "1"-state element. The effective element 40 is either a "0"-state element or a "1"-state element. When the cell data is "0", the effective element 40 is a "0"-state element. When the cell data is "1", the effective element 40 is a "1"-state element.

Figure 6:
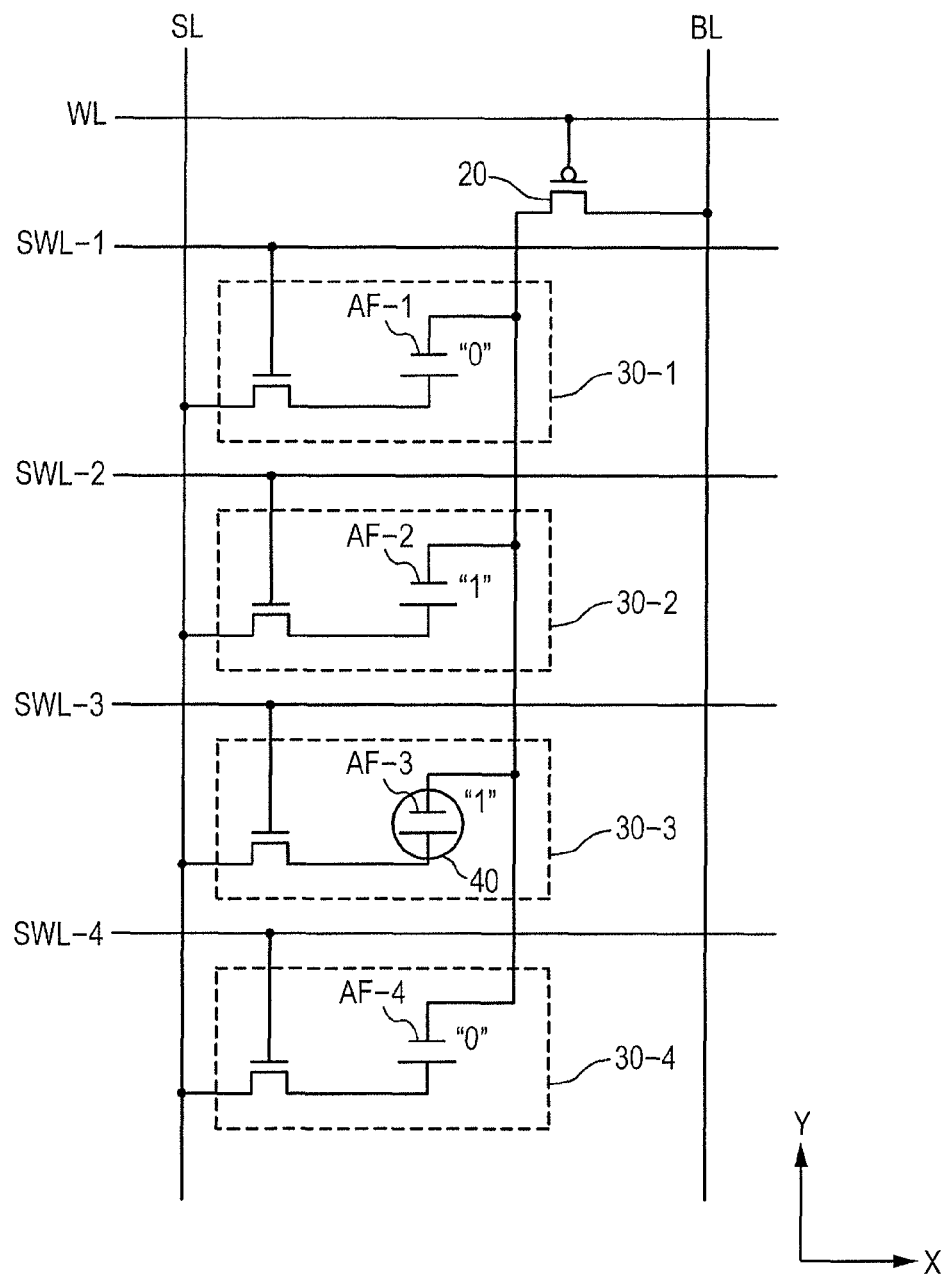
FIG. 6 is a conceptual diagram showing a unit cell according to a first usage example of the embodiment of the present invention.

FIG. 6 is a conceptual diagram showing a unit cell 10 used in a first usage example. In the unit cell 10 shown in FIG. 6, antifuse elements AF-1 and AF-4 are "0"-state elements, and antifuse elements AF-2 and AF-3 are "1"-state elements. Hence, in terms of the memory units 30, memory units 30-1 and 30-4 are "0"-state units, and memory units 30-2 and 30-3 are "1"-state units. The effective element 40 is the antifuse element AF-3 and the cell data is "1".

3-1 Data Write Operation

Figure 7:
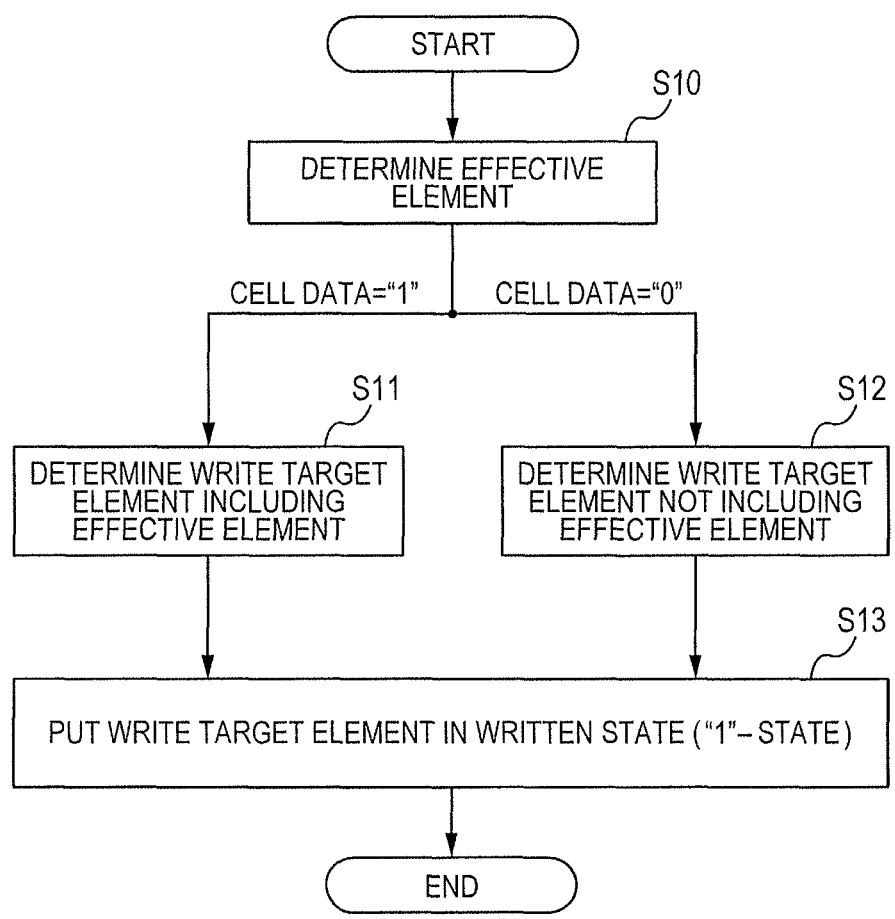
FIG. 7 is a flowchart showing a method of writing data to a unit cell according to the first usage example.

In writing cell data in the selected unit cell 10s, the control circuit 100 controls data write operation such that the effective element 40 enters a state corresponding to the cell data and such that at least one "0"-state element and at least one "1"-state element are present in the selected unit cell 10s. The data writing procedure used in the first usage example will be described with reference to the flowchart shown in FIG. 7.

Step S10: First, the control circuit 100 determines which one of the antifuse elements AF-1 to AF-n is to be an effective element 40. To be concrete, the control circuit 100 determines one of numbers 1 to n to be an "effective number e" and makes the antifuse element AF-e the effective element 40. For example, the control circuit 100 determines the effective number e by performing calculation using address information (number X of selected word line WLs and number Y of selected bit line BLs) on the selected unit cell 10s. In addition to numbers X and Y, code Z recorded at a different location or given from outside may also be used in the calculation. In this way, the control circuit 100 can determine an effective number e, i.e. an effective element 40, for each unit cell 10.

Steps S11 and S12: Next, the control circuit 100 determines one of the antifuse elements AF-1 to AF-n to be a "write target element" to which data "1" is to be written. More than one write target element may be determined. Since the selected unit cell 10s must include at least one "0"-state element and at least one "1"-state element, the number of write target elements cannot exceed (n−1). Of the antifuse elements AF-1 to AF-n included in the selected unit cell 10s, those other than the write target elements are non-write target elements.

When the cell data to be written in the selected unit cell 10s is "1", the control circuit 100 determines the write target elements such that they at least include the effective element 40 (step S11). When the cell data to be written in the selected unit cell 10s is "0", the control circuit 100 determines the write target elements such that they do not include the effective element 40 (in other words, the non-write target elements are determined such that they at least include the effective element 40) (step S12).

Step S13: The control circuit 100 writes the cell data to the write target elements and put each of the write target elements in a written state (in a "1"-state). In this way, the effective element 40 is put in a state corresponding to the cell data and the selected unit cell 10s results in including both at least one "0"-state element and at least one "1"-state element. When plural antifuse elements are made write target elements, in order to realize good written states of the write target elements, it is preferable that the write target elements sequentially have the cell data written to them (one write target element at a time) without being subjected to write operation at a time.

In the example shown in FIG. 6: the effective number e is "3"; the effective element 40 is the antifuse element AF-3; the cell data is "1"; and the write target elements are the antifuse elements AF-2 and AF-3. The cell data "1" is written to the antifuse elements AF-2 and AF-3 sequentially.

Even though, in the present example, the antifuse elements AF have data written to them only when the data is "1", the control circuit 100 performs control in the same manner also when a different type of ReRAM elements 31 are used. Namely, the control circuit 100 is required to control data write operation such that the effective element 40 enters a state corresponding to the cell data and such that at least one "0"-state element and at least one "1"-state element are present in the selected unit cell 10s.

3-2 Data Read Operation

Read operation to read the cell data from the selected unit cell 10s is performed as follows. First, the control circuit 100 determines an effective number e, i.e. an effective element 40, as in the foregoing data write operation.

Next, the control circuit 100 determines plural read target elements out of the antifuse elements AF-1 to AF-n. The plural read target elements include an effective element 40, at least one "0"-state element and at least one "1"-state element. In the simplest case, the control circuit 100 may determine all the antifuse elements AF-1 to AF-n to be read target elements, since the antifuse elements AF-1 to AF-n include, without fail, an effective element 40, at least one "0"-state element and at least one "1"-state element. When reading data from the read target elements, the control circuit 100 sequentially selects them one by one.

Figure 8:
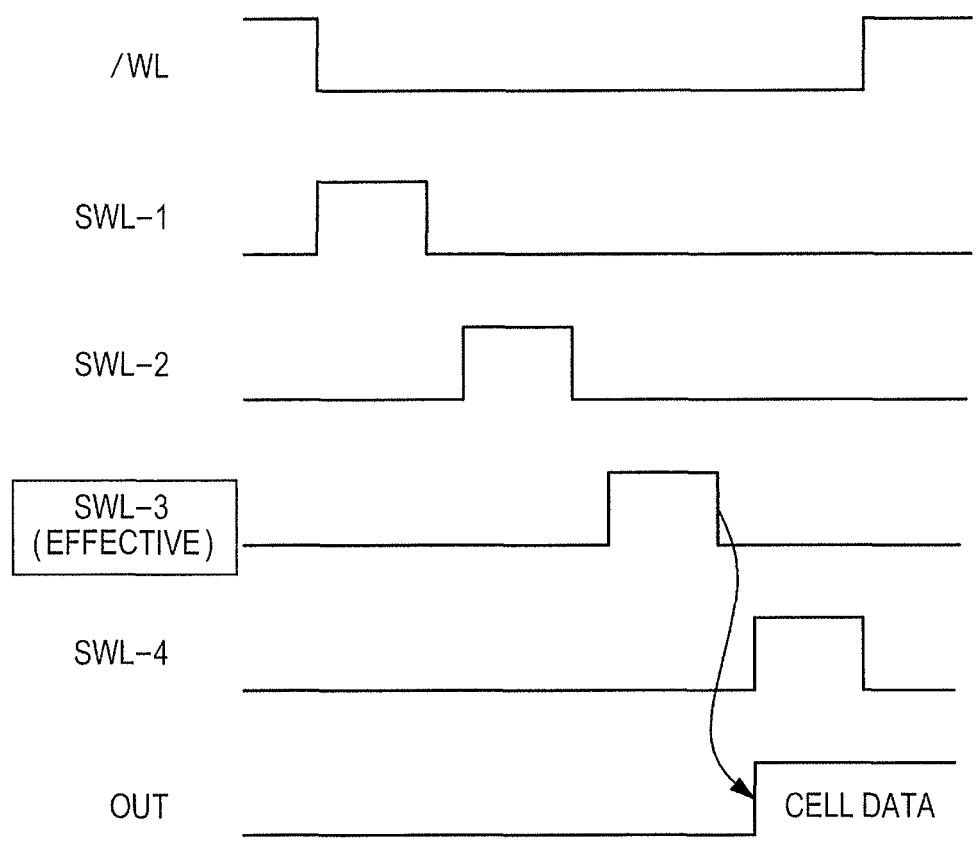
FIG. 8 is a timing chart showing a method of reading data from a unit cell according to the first usage example.

FIG. 8 is a timing chart of an example data read operation for reading data from the unit cell 10 shown in FIG. 6. The effective element 40 is the antifuse element AF-3 and all the antifuse elements AF-1 to AF-4 are the read target elements. In this case, the control circuit 100 sequentially selects the subword lines SWL-1 to SWL-4 one by one. When the subword lines SWL-1, SWL-2 and SWL-4 are selected, the control circuit 100 does not adopt the data read out. Only when the effective subword line SWL-3 is selected, the control circuit 100 adopts the data read out as the cell data recorded in the selected unit cell 10s and outputs the cell data as output data OUT.

3-3 Advantageous Effect

In the first usage example described above, when data is read from the selected unit cell 10s, both "0"-state elements and "1"-state elements are selected, so that it is difficult to determine from outside whether the effective element 40 is a "0"-state element or a "1"-state element, i.e. whether the cell data is "0" or "1".

When a "1"-state element is selected, faint photoemission may be detected using, for example, the analysis technique disclosed in U.S. Pat. No. 5,940,545. The detection of photoemission, however, does not necessarily mean that the effective element 40 is a "1"-state element. Also, the detection of no photoemission does not necessarily mean that the effective element 40 is a "0"-state element. Namely, it is not possible to identify the cell data based on whether or not photoemission is detected.

As described above, using the unit cell 10 of the present embodiment improves the tamper resistance of the cell. The tamper resistance improvement effect is greater when the number of read target elements is larger.

4. Second Usage Example

In a second usage example, the number of effective elements 40 is 2 or larger, whereas each unit cell 10 need not necessarily include both a "0"-state element and a "1"-state element.

Figure 9:
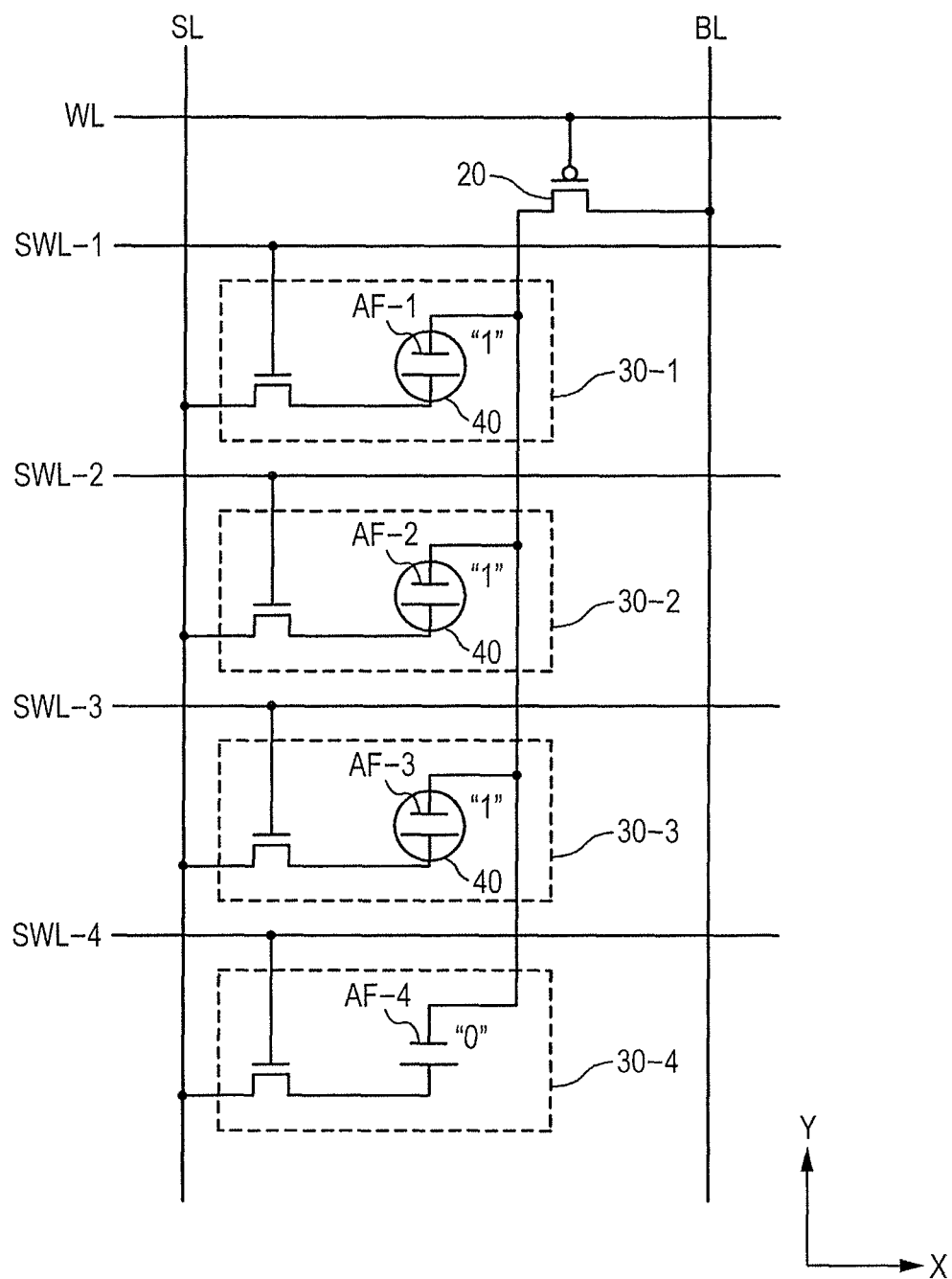
FIG. 9 is a conceptual diagram showing a unit cell according to a second usage example of the embodiment of the present invention.

FIG. 9 is a conceptual diagram showing a unit cell 10 used in a second usage example. In the unit cell 10 shown in FIG. 9, three antifuse elements AF-1 to AF-3 are effective elements 40 and the cell data is "1". Hence, the cell data "1" is recorded on each of the antifuse elements AF-1 to AF-3, and data "0" is recorded on the antifuse element AF-4.

4-1 Data Write Operation

Figure 10:
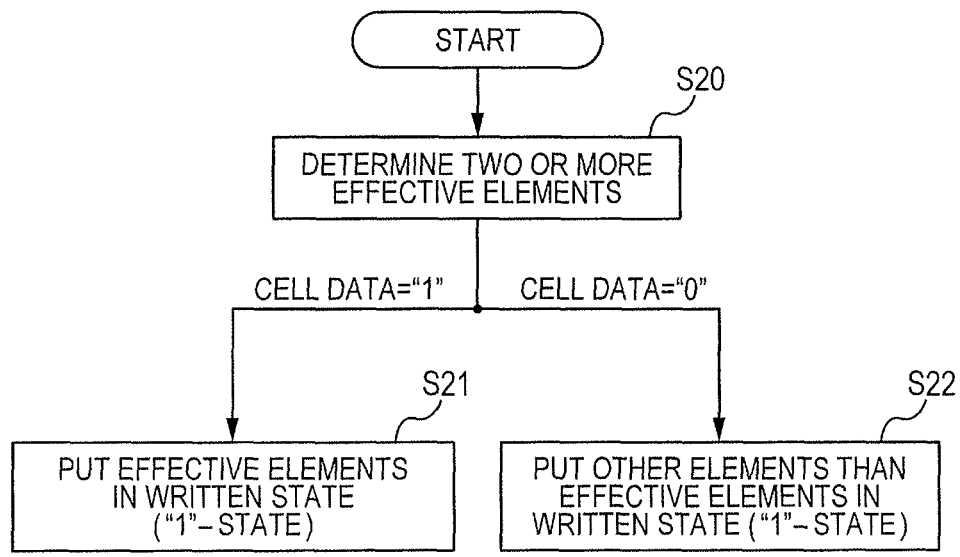
FIG. 10 is a flowchart showing a method of writing data to a unit cell according to a second usage example of the embodiment of the present invention.

In writing cell data in the selected unit cell 10s, the control circuit 100 controls data write operation such that the two or more effective elements 40 each enter a state corresponding to the cell data. The data writing procedure used in the second usage example will be described with reference to the flowchart shown in FIG. 10.

Step S20: First, the control circuit 100 determines two or more of the antifuse elements AF-1 to AF-n included in the selected unit cell 10s to be effective elements 40. Effective numbers e are determined in the same manner as in the first usage example.

Step S21: When the cell data recorded in the selected unit cell 10s is "1", the control circuit 100 executes the data write operation on the effective elements 40 putting each of them in a written state ("1"-state). In order to realize good written states of the effective elements 40, it is preferable that the effective elements 40 sequentially have the cell data written to them (one effective element at a time) without being subjected to write operation at a time.

Step S22: When the cell data recorded in the selected unit cell 10s is "0", the control circuit 100 executes the data write operation on the other antifuse elements AF than the effective elements 40. In this case, the effective elements 40 are each left in an unwritten state ("0 state").

In the example shown in FIG. 9: the effective numbers e are 1, 2 and 3; the effective elements 40 are the antifuse elements AF-1 to AF-3; and the cell data is "1". The cell data "1" is written to the antifuse elements AF-1, AF-2 and AF-3, sequentially.

Even though, in the present example, the antifuse elements AF have data written to them only when the data is "1", the control circuit 100 performs control in the same manner also when a different type of ReRAM elements 31 are used. Namely, the control circuit 100 is required to control data write operation such that the effective elements 40 each enter a state corresponding to the cell data.

4-2 Data Read Operation

Read operation to read the cell data from the selected unit cell 10s is performed as follows. First, the control circuit 100 determines two or more effective numbers e, i.e. effective elements 40, as in the foregoing data write operation. The control circuit 100 then selects the two or more effective elements at a time as selected elements.

Figure 11:
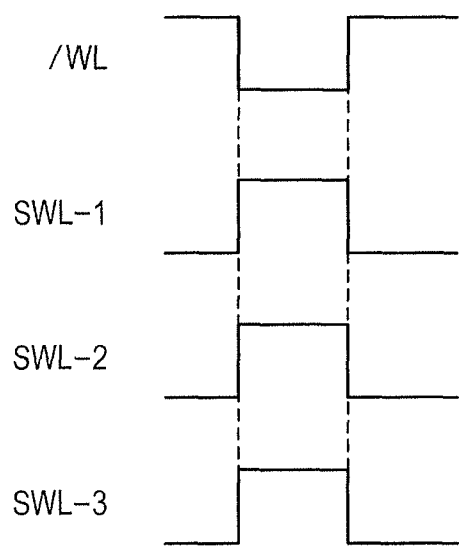
FIG. 11 is a timing chart showing a method of reading data from a unit cell according to the second usage example.

FIG. 11 is a timing chart of an example data read operation for reading data from the unit cell 10 shown in FIG. 9. The effective numbers e are 1, 2 and 3. The effective elements 40 are the antifuse elements AF-1 to AF-3. The control circuit 100, therefore, selects the effective subword lines SWL-1 to SWL-3 at a time. In this case, an element current flows through each of the effective elements AF-1 to AF-3 simultaneously. The cell current that flows through the selected unit cell 10s (selected bit line BLs) equals the sum of the element currents that flow through the effective elements AF-1 to AF-3. The control circuit 100 determines, based on the cell current (the sum of the element currents), that the cell data is "1".

4-3 Advantageous Effect

Figure 12:
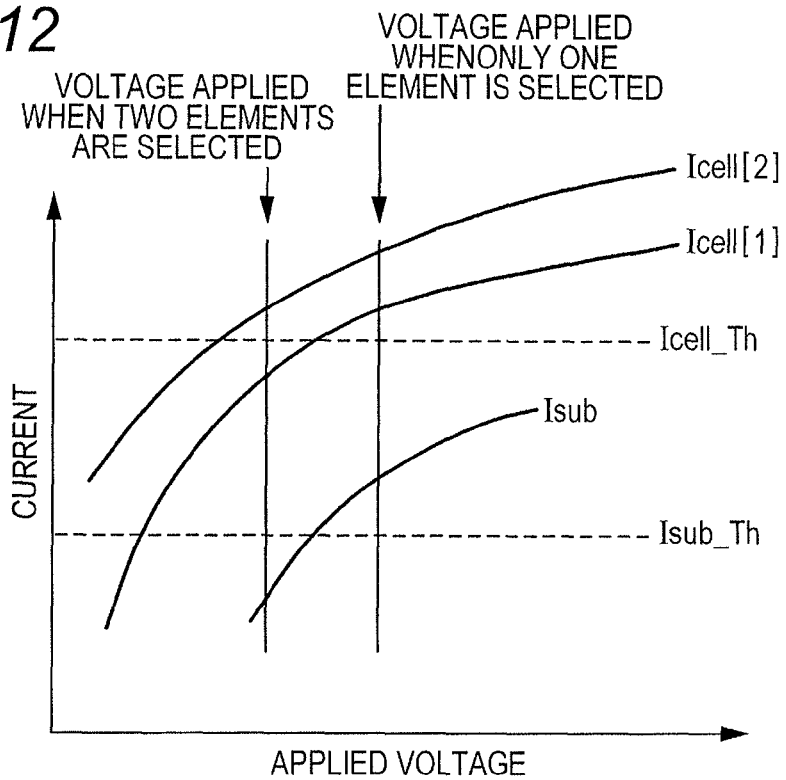
FIG. 12 is a graph for explaining the operation and effect of the second usage example.

The advantageous effect of the second usage example will be described with reference to FIG. 12. In the graph of FIG. 12, the horizontal axis represents the read voltage applied, in data read operation, between the selected bit line BLs and the selected source line SLs and the vertical axis represents the value of current. Icell [1] represents the cell current that flows through the selected unit cell 10s (selected bit line BLs) when the cell data is "1". Icell_Th represents the minimum level of the cell current Icell (1) required to determine whether the data is "0" or "1" at the sense amplifier. Isub represents the substrate current that flows, in data read operation, through a P-well 1 of a single "1"-state element. Isub_Th represents the substrate current that corresponds to the minimum photoemission intensity detectable using the analysis technique disclosed in U.S. Pat. No. 5,940,545. Namely, when the substrate current Isub exceeds Isub_Th, the emission intensity reaches the detectable level to possibly allow the stored data to be determined.

As a method of reducing the substrate current Isub to below the Isub-Th, the read voltage may be lowered. Simply lowering the read voltage without any arrangement, however, may cause the cell current Icell [1] to reduce below the Icell_Th making it impossible for the sense amplifier to correctly determine the data read from the selected unit cell.

In the second usage example, the number of effective elements 40 is two or larger and, in data read operation, all the effective elements 40 are selected at a time. Since the effective elements 40 are coupled in parallel between a first node N1 (common node) and the source line SL, when the cell data is "1", element currents corresponding to the effective elements 40 flow through them in parallel. Hence, by lowering the read voltage, the cell current Icell [2] to flow through the selected unit cell 10s (selected bit line BLs) can be made about the same, in amount, as in cases where only one effective element 40 is selected. Namely, the cell current Icell [2] large enough to exceed the Icell_Th can be obtained. As a result, the substrate current Isub is reduced compared with when only one effective element 40 is selected.

When two or more effective elements 40 are selected at a time, the cell current Icell [2] to flow through the selected unit cell 10s (selected bit line BLs) tends to increase compared with when only one effective element 40 is selected. It is, therefore, possible to obtain an adequate amount of cell current Icell [2] while keeping the read voltage unchanged. In this case, the margin for Icell_Th becomes larger, so that it is possible to implement a cost reduction measure, for example, reducing the sensitivity of the sense amplifier.

As described above, according to the second example usage, the substrate current Isub can be reduced while securing an adequately large cell current Icell [2]. Namely, the intensity of photoemission can be reduced while securing adequate data reading sensitivity. Unless the intensity of photoemission reaches a detectable level, the cell data cannot be determined using the analysis technique disclosed in U.S. Pat. No. 5,940,545. Hence, according to the second example usage, the tamper resistance of the unit cell is improved. When the number of effective elements 40 is larger, the substrate current Isub is smaller resulting in a greater effect to improve the tamper resistance.

Figure 13:
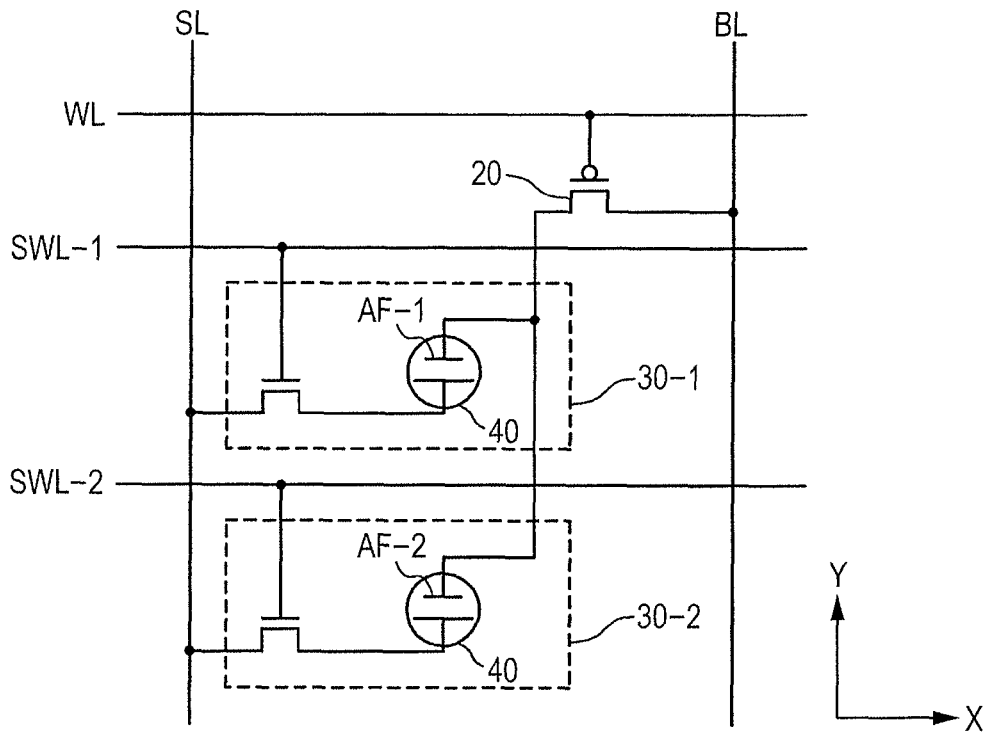
FIG. 13 is a conceptual diagram showing another example of unit cell according to the second usage example.

In the second usage example, each unit cell 10 is not required to include both "0"-state elements and "1"-state elements. For example, as shown in FIG. 13, all the antifuse elements AF-1 and AF-2 in a unit cell 10 may be used as effective elements 40.

5. Layout

Figure 14:
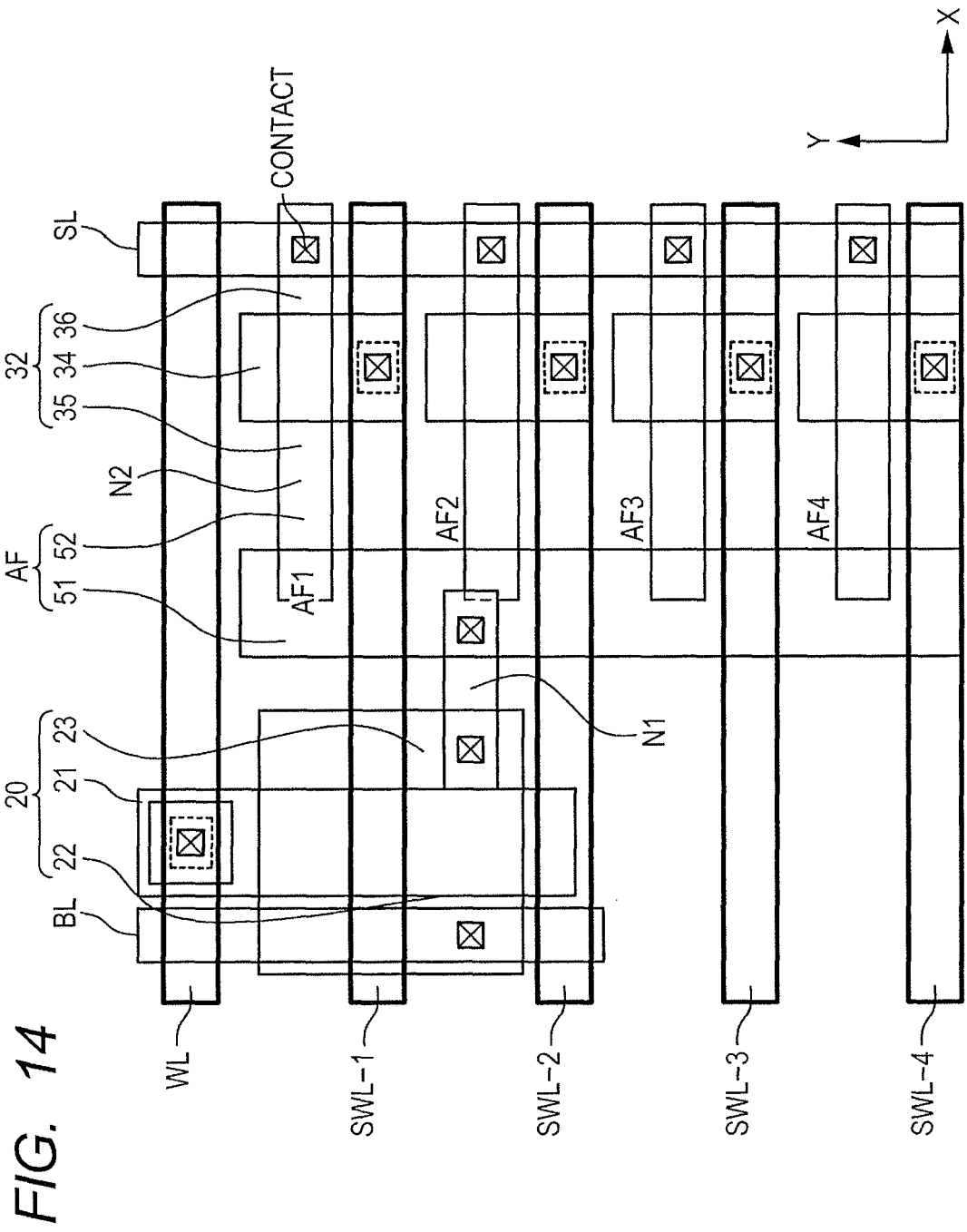
FIG. 14 is a plan view showing an example layout of a unit cell according to the embodiment of the present invention.

FIG. 14 shows an example planar layout of the unit cell 10 shown in FIG. 4. The word line WL and subword lines SWL-1 to SWL-4 extend in parallel in X direction. The bit line BL and source line SL extend in parallel in Y direction.

The cell selection transistor 20 includes a gate electrode 21 and source/drain diffusion layers 22 and 23 formed on both sides of the gate electrode 21. The gate electrode 21 (of polysilicon, polysilicon silicide or metallic material) is formed along Y direction and is coupled to the word line WL via a contact. The source/drain diffusion layer 22 is coupled to the bit line BL via a contact. The source/drain diffusion layer 23 is coupled to the first node N1 via a contact.

Each element selection transistor 32 includes a gate electrode 34 and source/drain diffusion layers 35 and 36 formed on both sides of the gate electrode 34. The gate electrode 34 (of polysilicon, polysilicon silicide or metallic material) is formed along Y direction and is coupled to the subword line SWL via a contact. The source/drain diffusion layer 36 is coupled to the source line SL via a contact.

Each antifuse element AF includes a gate electrode 51 (of polysilicon, polysilicon silicide or metallic material) and a fuse diffusion layer 52. The electrode 51 is the first terminal T1 of the antifuse element AF and is coupled to the first node N1 via a contact. The fuse diffusion layer 52 is the second terminal T2 of the antifuse element AF and is coupled to the source/drain diffusion layer 35 of the element selection transistor 32.

In the example shown in FIG. 14, the fuse diffusion layer 52 of the antifuse element AF and the source/drain diffusion layer 35 of the element selection transistor 32 are a common diffusion layer (N-type diffusion layer). This reduces the layout area of the unit cell 10.

As shown in FIG. 14, plural antifuse elements AF-1 to AF-4 are arranged in a column along Y direction. The gate electrode 51 is a common gate electrode for the antifuse elements AF-1 to AF-4. Namely, the gate electrode 51 formed to extend in Y direction is shared by the antifuse elements AF-1 to AF-4. This reduces the layout area of the unit cell 10.

The fact that the gate electrode 51 is shared by the antifuse elements AF-1 to AF-4 generates the following advantageous effect. In the foregoing first usage example, each unit cell includes at least one "0"-state element and at least one "1"-state element. This keeps the common electrode 51 electrically coupled to the substrate silicon, so that the common electrode 51 and the substrate silicon are kept at a same potential. Therefore, even if the voltage contrast (VC) method is used as an analysis means to be applied to a unit cell with upper wiring removed to expose contact portions, whether the cell data is "0" or "1" cannot be determined.

Figure 15:
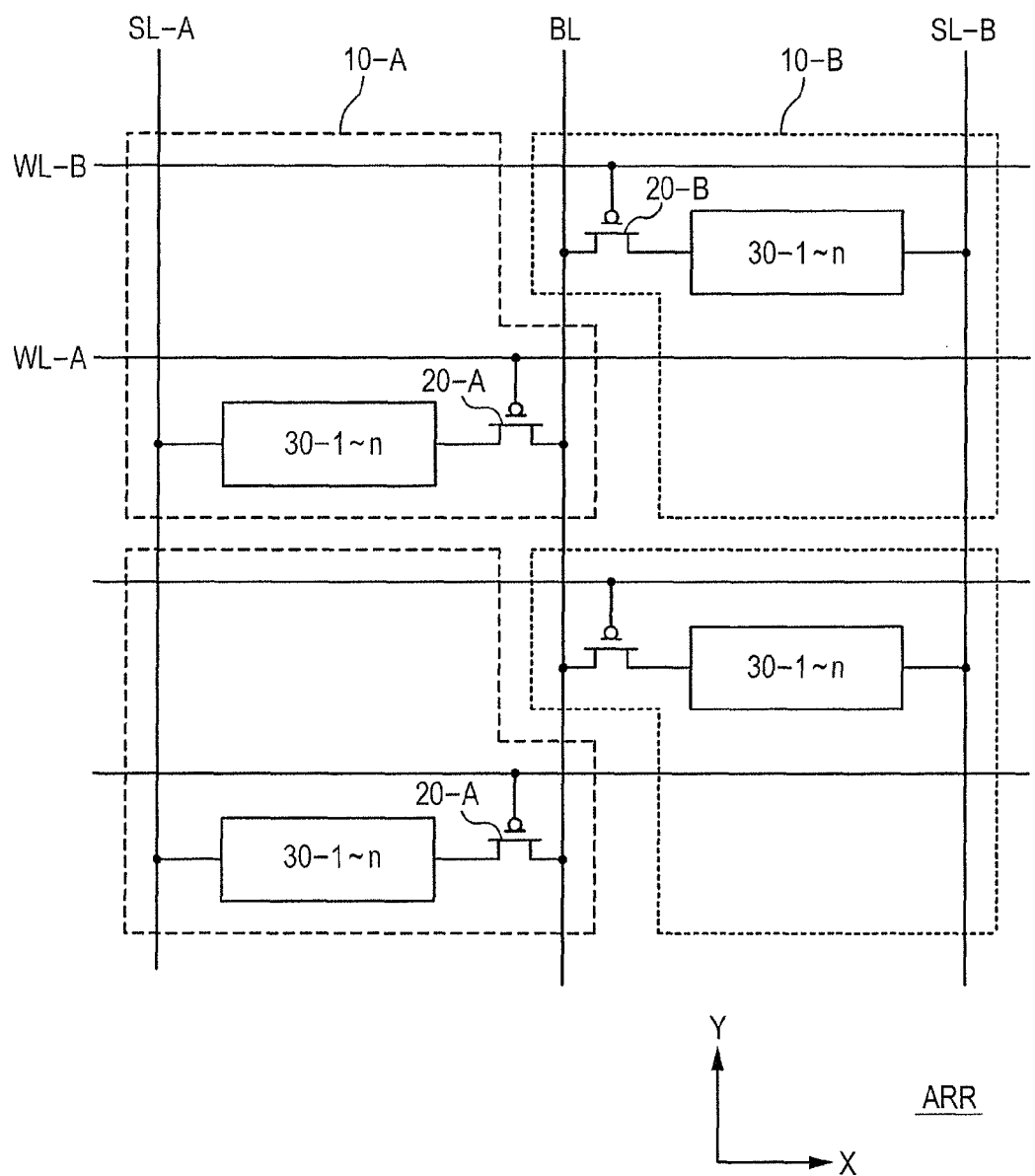
FIG. 15 is a circuit diagram showing an example configuration of a memory cell array including unit cells according to the embodiment of the present invention.
Figure 16:
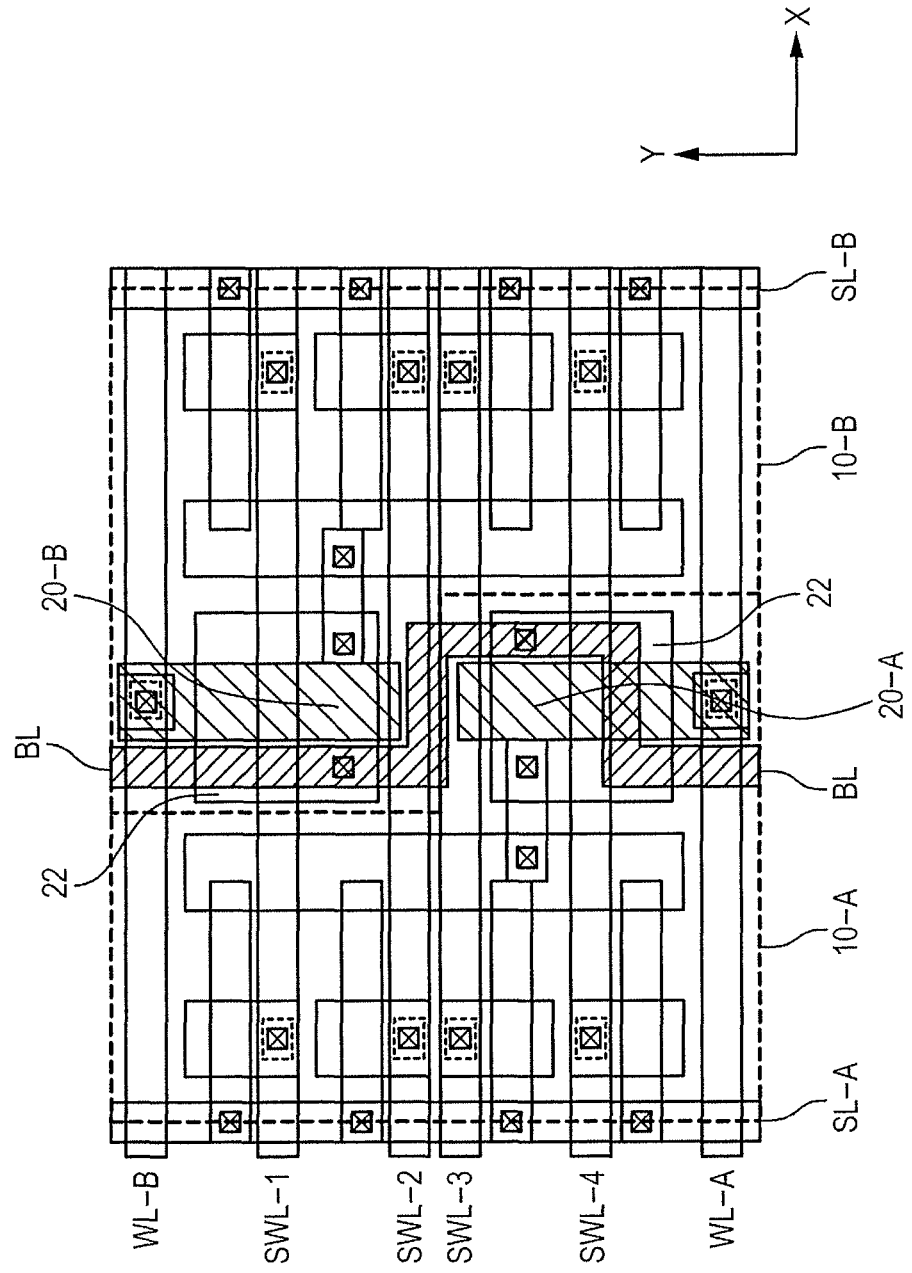
FIG. 16 is a plan view showing an example layout of the memory cell array shown in FIG. 15.

FIG. 15 shows an example of modified configuration of the memory cell array according to the present embodiment. FIG. 16 shows an example planar layout of the memory cell array shown in FIG. 15. The planar layout of each unit cell 10 is the same as that shown in FIG. 14, so that the description of the layout will be appropriately omitted in the following.

In the modified memory cell array configuration shown in FIGS. 15 and 16, the unit cells 10-A and 10-B arranged adjacently in X direction are coupled to word lines WL-A and WL-B, respectively, while sharing the same bit line BL. To be more concrete, the cell selection transistor 20-A of the unit cell 10-A and the cell selection transistor 20-B of the unit cell 10-B are formed adjacently in Y direction. The gate electrode 21 of the cell selection transistor 20-A is coupled to the word line WL-A via a contact. The gate electrode 21 of the cell selection transistor 20-B is coupled to the word line WL-B via a contact. The source/drain diffusion layers 22 of the cell selection transistors 20-A and 20-B are coupled to the common bit line BL via contacts.

Figure 17:
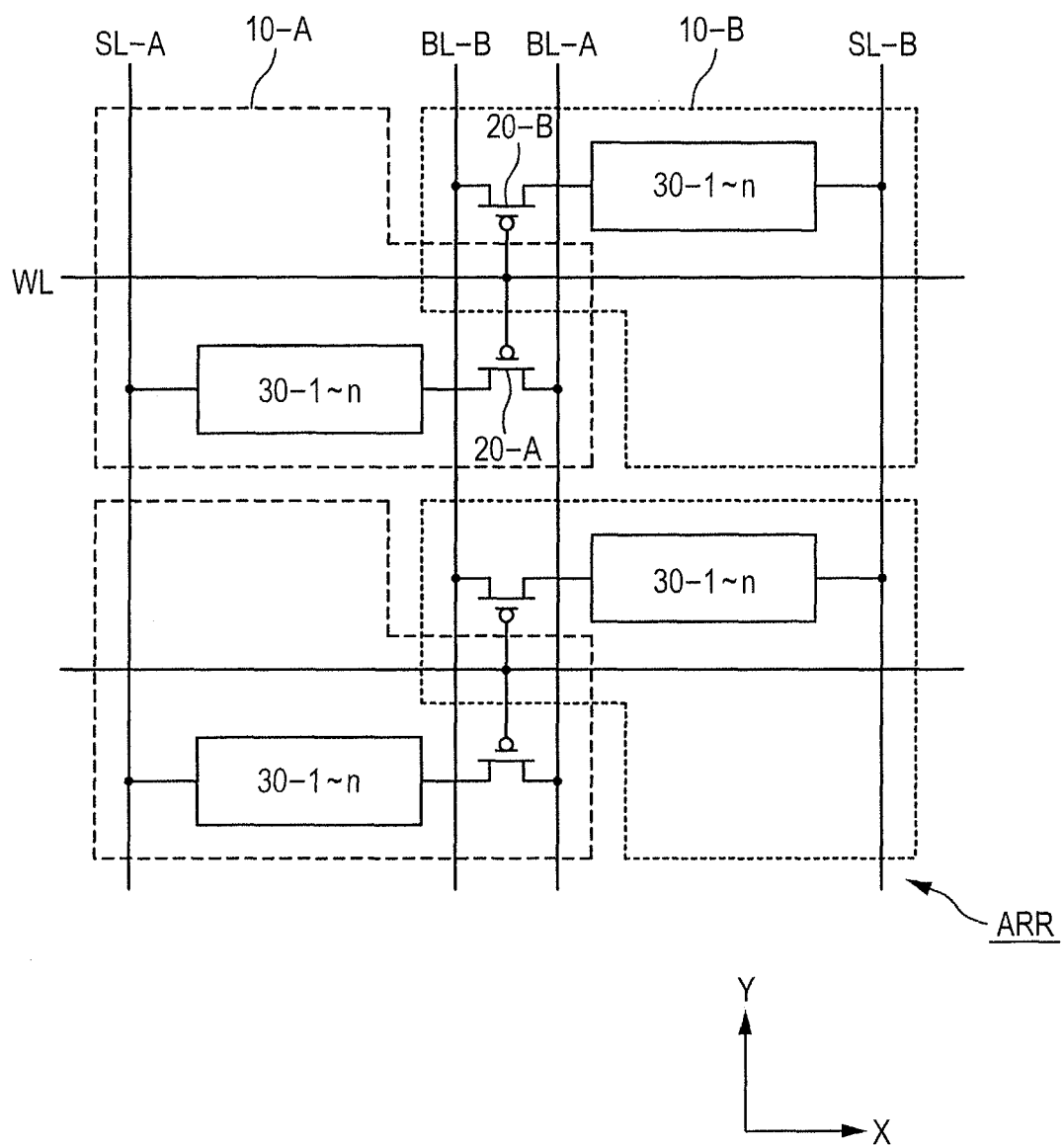
FIG. 17 is a circuit diagram showing another example configuration of a memory cell array including unit cells according to the embodiment of the present invention.
Figure 18:
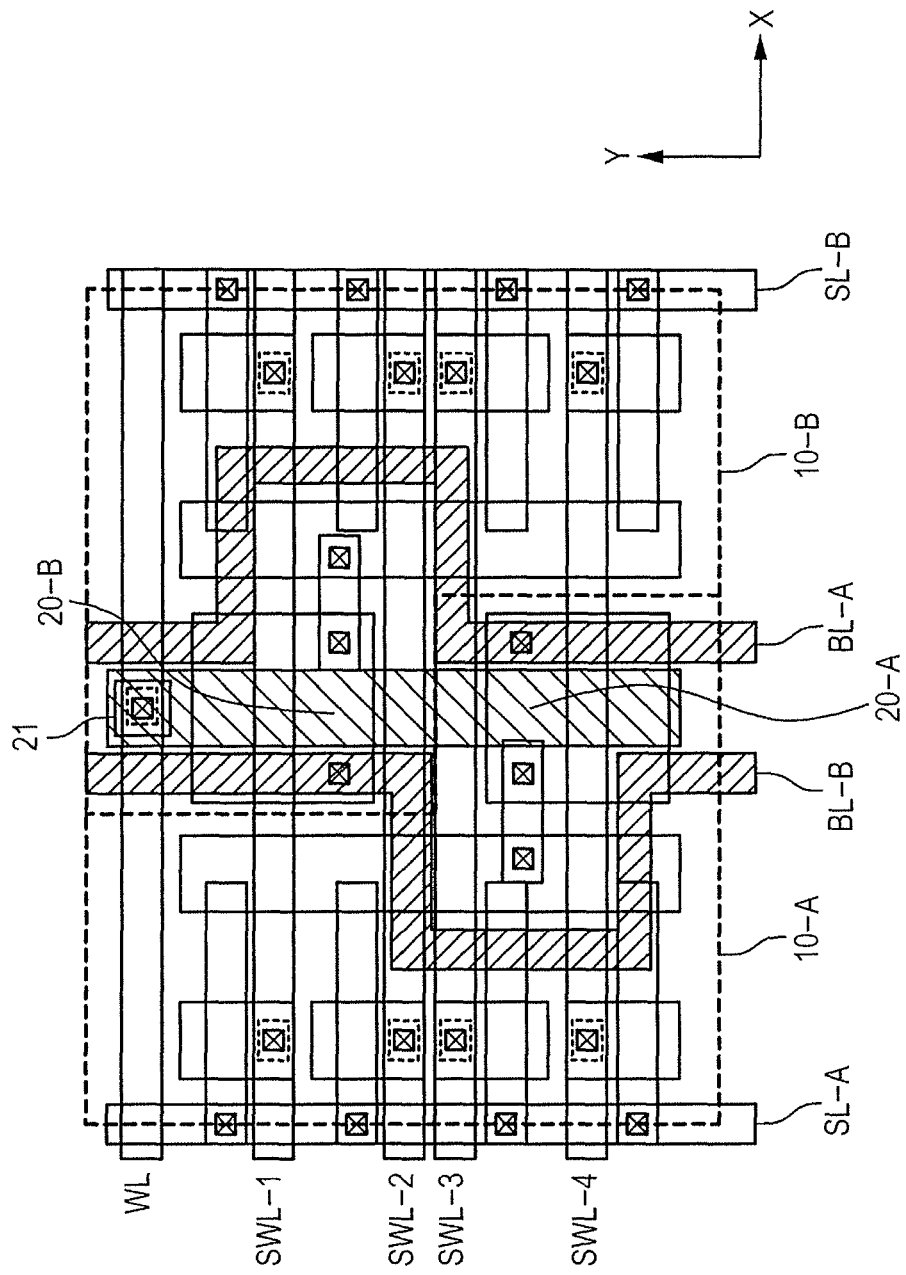
FIG. 18 is a plan view showing an example layout of the memory cell array shown in FIG. 17.

FIG. 17 shows another example of modified configuration of the memory cell array according to the present embodiment. FIG. 18 shows an example planar layout of the memory cell array shown in FIG. 17. The planar layout of each unit cell 10 is the same as that shown in FIG. 14, so that the description of the layout will be appropriately omitted in the following.

In the modified memory cell array configuration shown in FIGS. 17 and 18, the unit cells 10-A and 10-B are arranged adjacently in X direction and their cell selection transistors 20 share a gate electrode 21. To be more concrete, the cell selection transistor 20-A of the unit cell 10A and the cell section transistor 20-B of the unit cell 10B are formed adjacently in Y direction and they share the common gate electrode 21 that is formed to extend in Y direction. This reduces the layout area of the memory cell array.

As for the bit lines, a bit line BL-A coupled to the unit cell 10-A is formed to bend near the cell selection transistor 20-B to be away from a contact portion of the unit cell 10-B. A bit line BL-B coupled to the unit cell 10-B is formed to bend near the cell selection transistor 20-A to be away from a contact portion of the unit cell 10-A.

Assume a line segment which connects, via the shortest distance possible, the branching point where the first bit line BL-A branches to the unit cell 10-A and the branching point where the first source line SL-A branches to the first unit cell 10-A. The line segment crosses the second bit line BL-B as seen in a planar view. Similarly, assume a line segment which connects, via the shortest distance possible, the branching point where the second bit line BL-B branches to the unit cell 10-B and the branching point where the second source line SL-B branches to the second unit cell 10-B. The line segment crosses the first bit line BL-A as seen in a planar view.

6. Other Example Configurations

Figure 19:
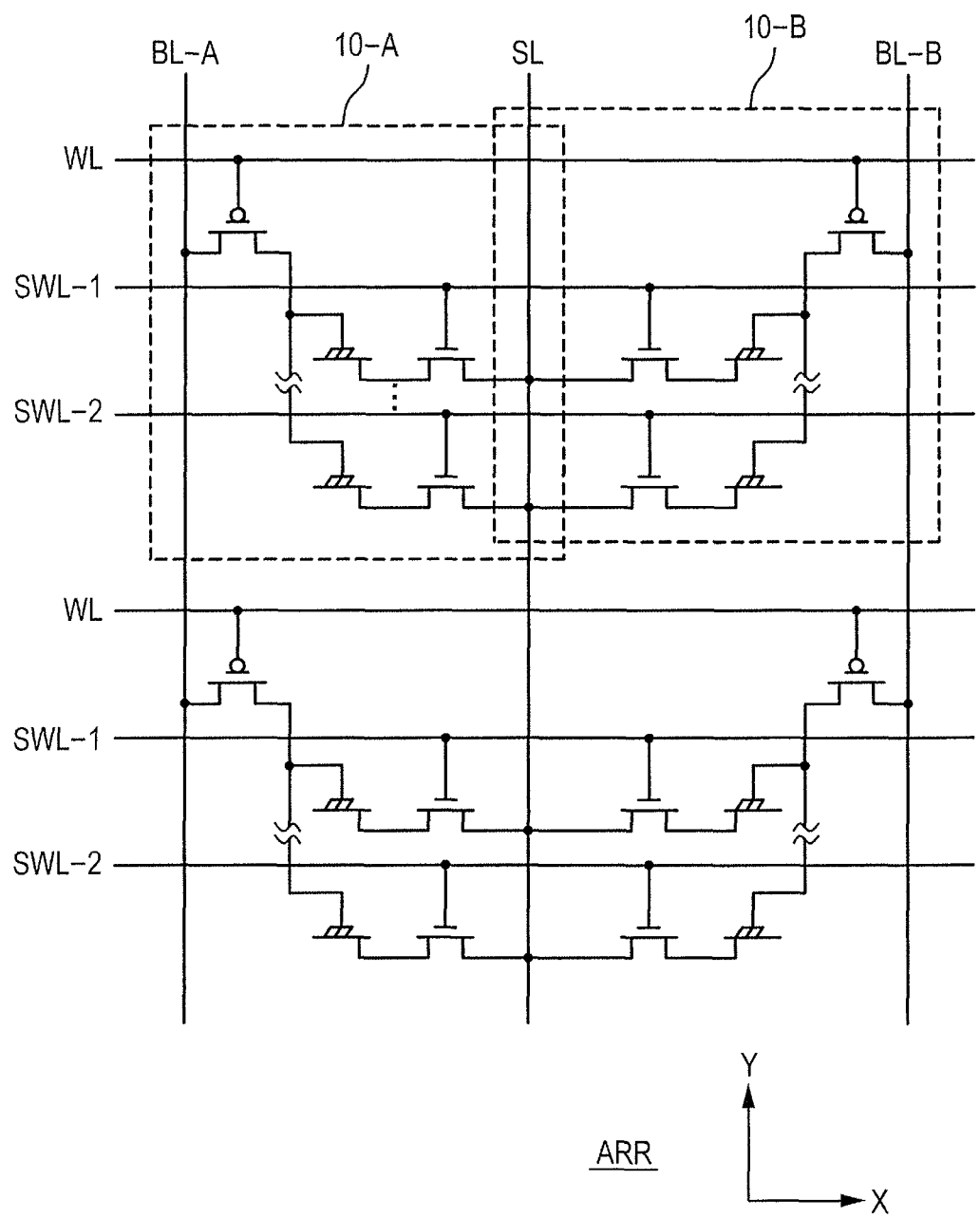
FIG. 19 is a circuit diagram showing still another example configuration of a memory cell array including unit cells according to the embodiment of the present invention.

FIG. 19 shows a still another example of modified configuration of the memory cell array according to the present embodiment. In the example configuration shown in FIG. 19, unit cells 10-A and 10-B are arranged adjacently in X direction and they share a source line SL. This reduces the layout area of the memory cell array.

Figure 20:
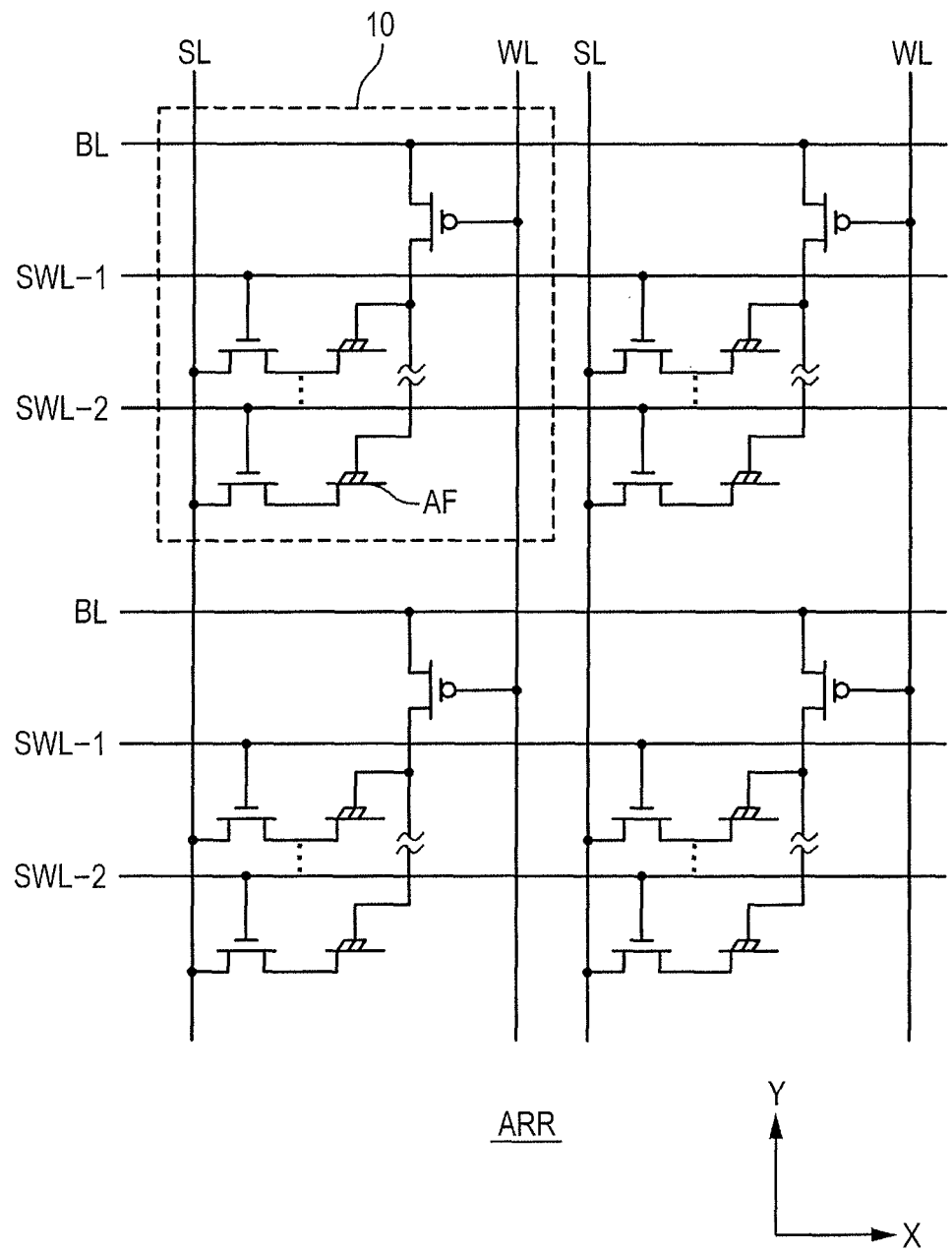
FIG. 20 is a circuit diagram showing still another example configuration of a memory cell array including unit cells according to the embodiment of the present invention.

FIG. 20 shows a still another example of modified configuration of the memory cell array according to the present embodiment. In the example configuration shown in FIG. 20, bit lines BL and subword lines SWL are formed to extend in parallel in X direction, and word lines WL and source lines SL are formed to extend in parallel in Y direction.

Figure 21:
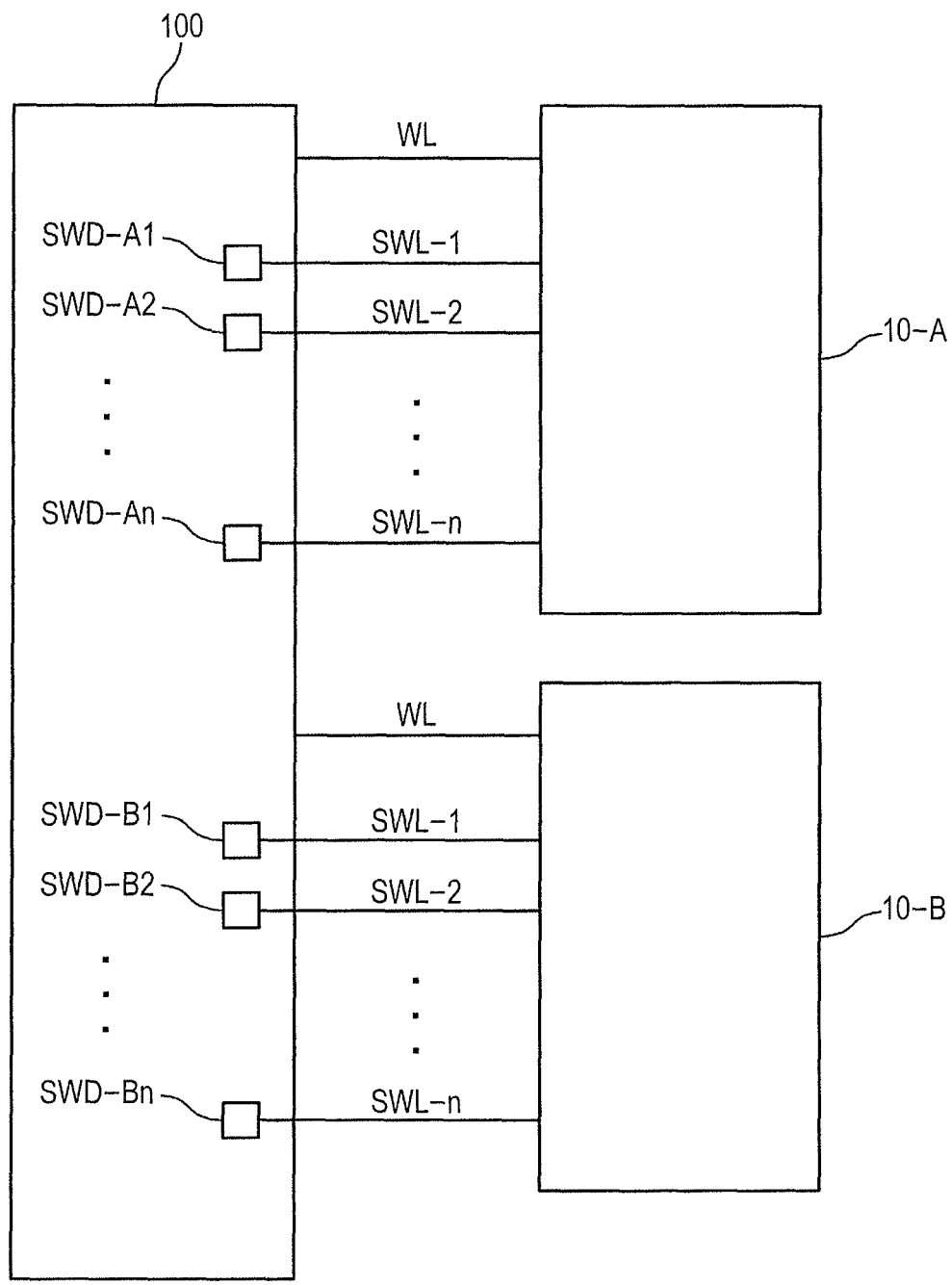
FIG. 21 is a block diagram showing still another example configuration of the embodiment of the present invention.
Figure 22:
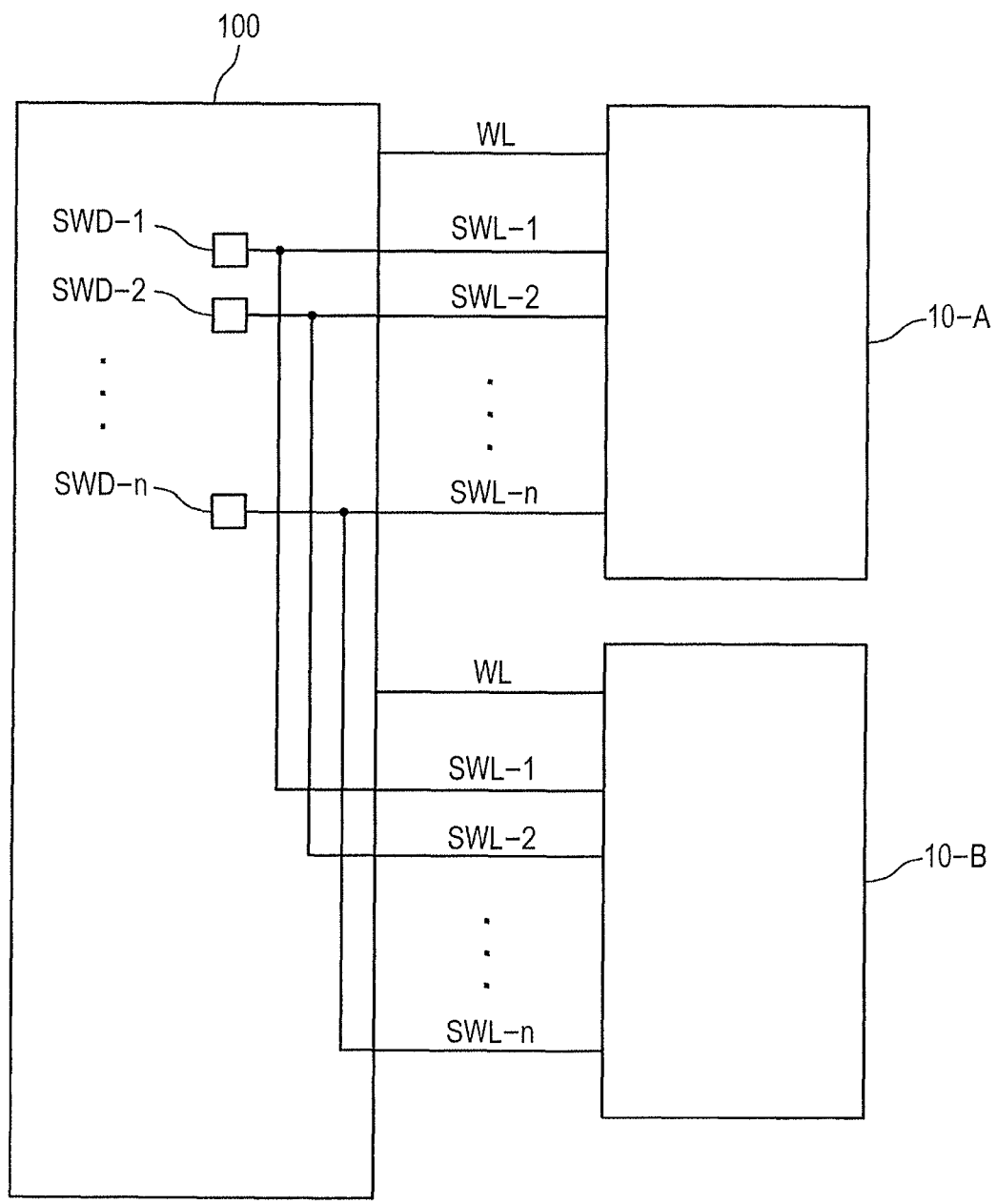
FIG. 22 is a block diagram showing still another example configuration of the embodiment of the present invention.

As for driving of the subword lines SWL, an independent subword driver SWD may be provided for each subword line SWL or subword drivers SWD each to be shared by two or more subword lines SWL may be provided. In the example configuration shown in FIG. 21, a subword driver SWD-Ai is provided for each subword line SWL-i of the unit cell 10-A, and a subword driver SWD-Bi is provided for each subword line SWL-i of the unit cell 10-B. In the example configuration shown in FIG. 22 on the other hand, a common subword driver SWD-i is provided to be shared by subword line SWL-i of the unit cell 10-A and subword line SWL-i of the unit cell 10-B. Because a unit cell 10 is selected using a word line WL, the configuration as shown in FIG. 22 can be adopted. From the viewpoint of reducing the area required for the subword drivers SWD, the configuration shown in FIG. 22 is more advantageous than the configuration shown in FIG. 21.

An embodiment of the present invention has been described with reference to the attached drawings. The present invention, however, is not limited to the above embodiment, and it can be modified by those skilled in the art without departing from the scope of the invention.

What is claimed is:

1. A semiconductor device provided with a unit cell which stores one bit of cell data and a control circuit;
    wherein the unit cell includes n resistive random access memory (ReRAM) elements (n being an integer of 2 or larger), at least one of the ReRAM elements being an effective element where the cell data is recorded, and
    wherein, in reading the cell data, the control circuit at least selects the effective element and reads data recorded thereon as the cell data.

2. The semiconductor device according to claim 1;
    wherein the ReRAM elements include a "0"-state element with data "0" recorded thereon and a "1"-state element with data "1" recorded thereon, and
    wherein the effective element is whichever one of the "0"-state element and the "1"-state element corresponds to the cell data.

3. The semiconductor device according to claim 2,
    wherein, in reading the cell data, the control circuit sequentially selects a plurality of read-target elements included in the ReRAM elements, the read-target elements including the effective element and both the "0"-state element and the "1"-state element.

4. The semiconductor device according to claim 3, wherein the read-target elements are the ReRAM elements.

5. The semiconductor device according to claim 1;
    wherein the number of the effective elements is two or larger, and
    wherein, in reading the cell data, the control circuit selects the effective elements at a time and determines the cell data based on a sum of element currents flowing through the effective elements.

6. The semiconductor device according to claim 1 wherein the ReRAM elements are each a MOS type antifuse element.

7. A semiconductor device provided with a unit cell which stores one bit of cell data, a word line, a bit line and a source line;
    wherein the unit cell includes a first transistor a gate of which is coupled to the word line, one of a source and a drain of which is coupled to the bit line and the other of the source and the drain of which is coupled to a first node and n memory units (n being an integer of two or larger) coupled in parallel between the first node and the source line, and
    wherein the memory units each include a resistive random access memory (ReRAM) element having a first terminal coupled to the first node and a second terminal coupled to a second node and a second transistor a gate of which is coupled to a subword line, one of a source and a drain of which is coupled to the second node and the other of the source and the drain of which is coupled to the source line.

8. The semiconductor device according to claim 7, wherein the memory units include a "0"-state unit in which data "0" is recorded on the ReRAM element and a "1"-state unit in which data "1" is recorded on the ReRAM element.

9. The semiconductor device according to claim 7, wherein the ReRAM element is a MOS type antifuse element, a gate electrode of the antifuse element being one of the first and the second terminal, a diffusion layer of the antifuse element being the other of the first and the second terminal.

10. The semiconductor device according to claim 9, wherein the gate electrode of the antifuse element is the first terminal, the gate electrode being shared by the memory units.

11. The semiconductor device according to claim 9, wherein the diffusion layer of the antifuse element is the second terminal, the diffusion layer being the same as one of the source and the drain of the second transistor.

12. The semiconductor device according to claim 7, wherein the gate electrode of the first transistor is common between adjacent unit cells.

13. The semiconductor device according to claim 7, wherein the second node only couples electrically, without branching, one of the source and the drain of the second transistor and the second terminal.

14. The semiconductor device according to claim 9, wherein the diffusion layer of the antifuse element is the second terminal, the diffusion layer being the same as one of the source and the drain of the second transistor.

* * * * *